(12) United States Patent
Currivan et al.

(10) Patent No.: US 7,953,170 B2
(45) Date of Patent: May 31, 2011

(54) SIGNAL PROCESSING UNDER ATTENUATED TRANSMISSION CONDITIONS

(75) Inventors: Bruce J. Currivan, Dove Canyon, CA (US); Thomas J. Kolze, Phoenix, AZ (US); Daniel H. Howard, Atlanta, GA (US); Gottfried Ungerboeck, Langnau am Albis (CH)

(73) Assignee: Broadcom Corporation, Irvine, CA (US)

( * ) Notice: Subject to any disclaimer, the term of this patent is extended or adjusted under 35 U.S.C. 154(b) by 214 days.

(21) Appl. No.: 12/434,668

(22) Filed: May 3, 2009

(65) Prior Publication Data

US 2009/0215403 A1 Aug. 27, 2009

Related U.S. Application Data

(63) Continuation of application No. 10/427,593, filed on May 1, 2003, now Pat. No. 7,529,289, which is a continuation-in-part of application No. 10/142,189, filed on May 8, 2002, now Pat. No. 7,110,434, said application No. 10/427,593 is a continuation-in-part of application No. 09/652,721, filed on Aug. 31, 2000, now Pat. No. 6,778,611.

(60) Provisional application No. 60/416,889, filed on Oct. 8, 2002, provisional application No. 60/367,564, filed on Mar. 26, 2002, provisional application No. 60/151,680, filed on Aug. 31, 1999.

(51) Int. Cl.
*H04L 27/28* (2006.01)

(52) U.S. Cl. ........................................................ 375/260
(58) Field of Classification Search .................. 375/221, 375/222, 260, 267
See application file for complete search history.

(56) References Cited

U.S. PATENT DOCUMENTS

| | | |
|---|---|---|
| 7,110,378 B2 * | 9/2006 | Onggosanusi et al. ........ 370/334 |
| 2004/0136399 A1 * | 7/2004 | Roberts .......................... 370/468 |
| 2009/0110123 A1 * | 4/2009 | Matthews ....................... 375/340 |
| 2009/0290667 A1 * | 11/2009 | McElwain ..................... 375/350 |

* cited by examiner

*Primary Examiner* — Don N Vo
(74) *Attorney, Agent, or Firm* — Garlick Harrison & Markison; Shayne X. Short

(57) ABSTRACT

Signal processing under attenuated transmission conditions. Within an orthogonal signal space, the number of orthogonal signals that are used to transmit information from a transmitter to a receiver is reduced and the transmitted power of each of the now remaining orthogonal signals is modified; this may involve increasing the power of all of the remaining orthogonal signals equally or alternatively modifying them individually. The same modulation used before the reduction may also be used afterwards; within communication systems having multiple transmitter-receiver paths, this will ensure that the communication system's throughput and efficiency will remain unchanged even when one (or more) transmitter-receiver paths are highly attenuated. In addition, robust mode operation is provided for ranging and registering of transmitter devices when entering the communication system. In addition, the unused orthogonal signals may be employed to support interference cancellation of those orthogonal signals that are used to transmit information.

20 Claims, 18 Drawing Sheets satellite communication system

High Definition Television (HDTV) communication system uni-directional microwave communication system bi-directional microwave communication system uni-directional point-to-point radio communication system bi-directional point-to-point radio communication system

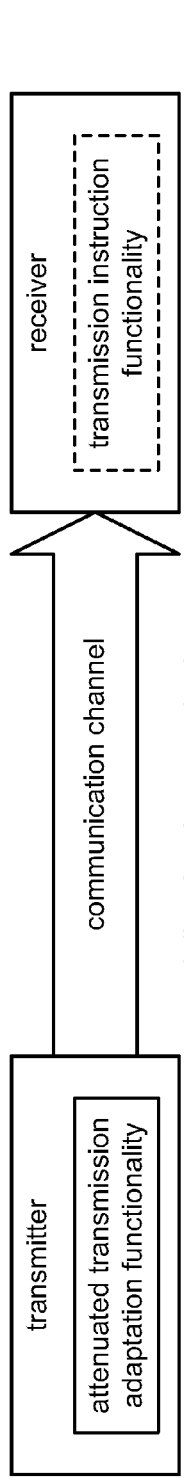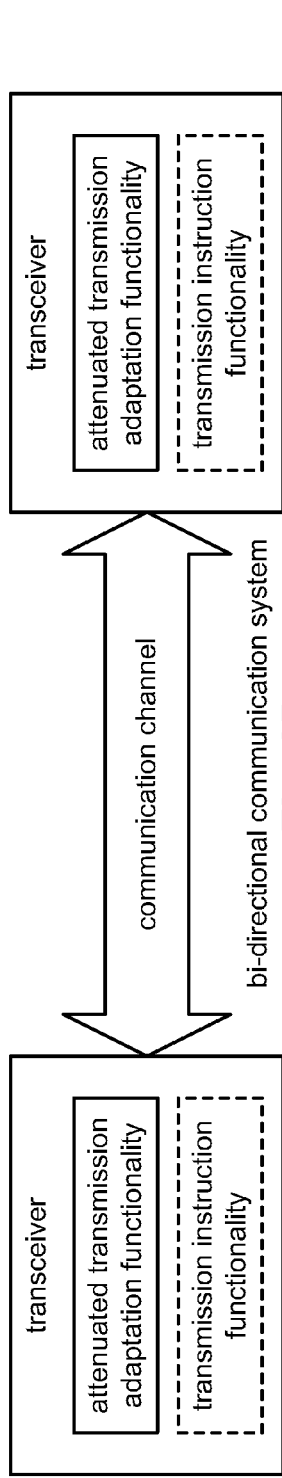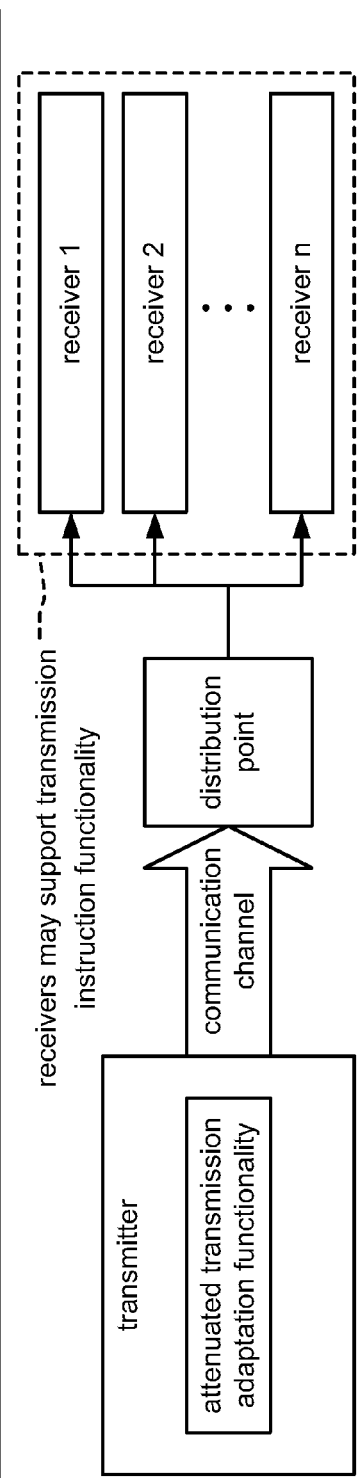

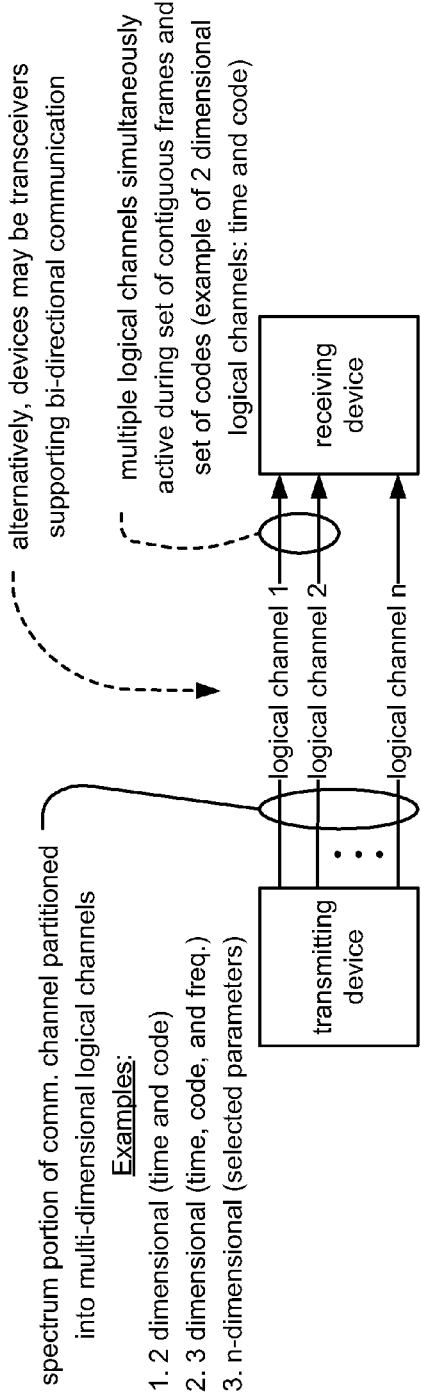
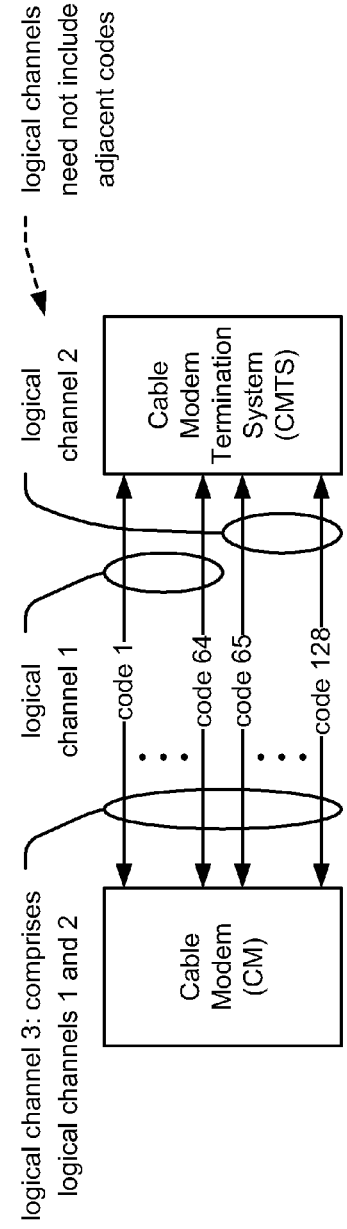
Fig. 10A — logical channel partitioning of portion of spectrum
Fig. 10B — embodiment of logical channel partitioning of S-CDMA codes in DOCSIS system alternative embodiment of logical channel partitioning of S-CDMA codes in DOCSIS system Fig. 15 attenuated transmission adaptation method employing power and modulation adaptation attenuated transmission adaptation method employing ranging and registering adaptation

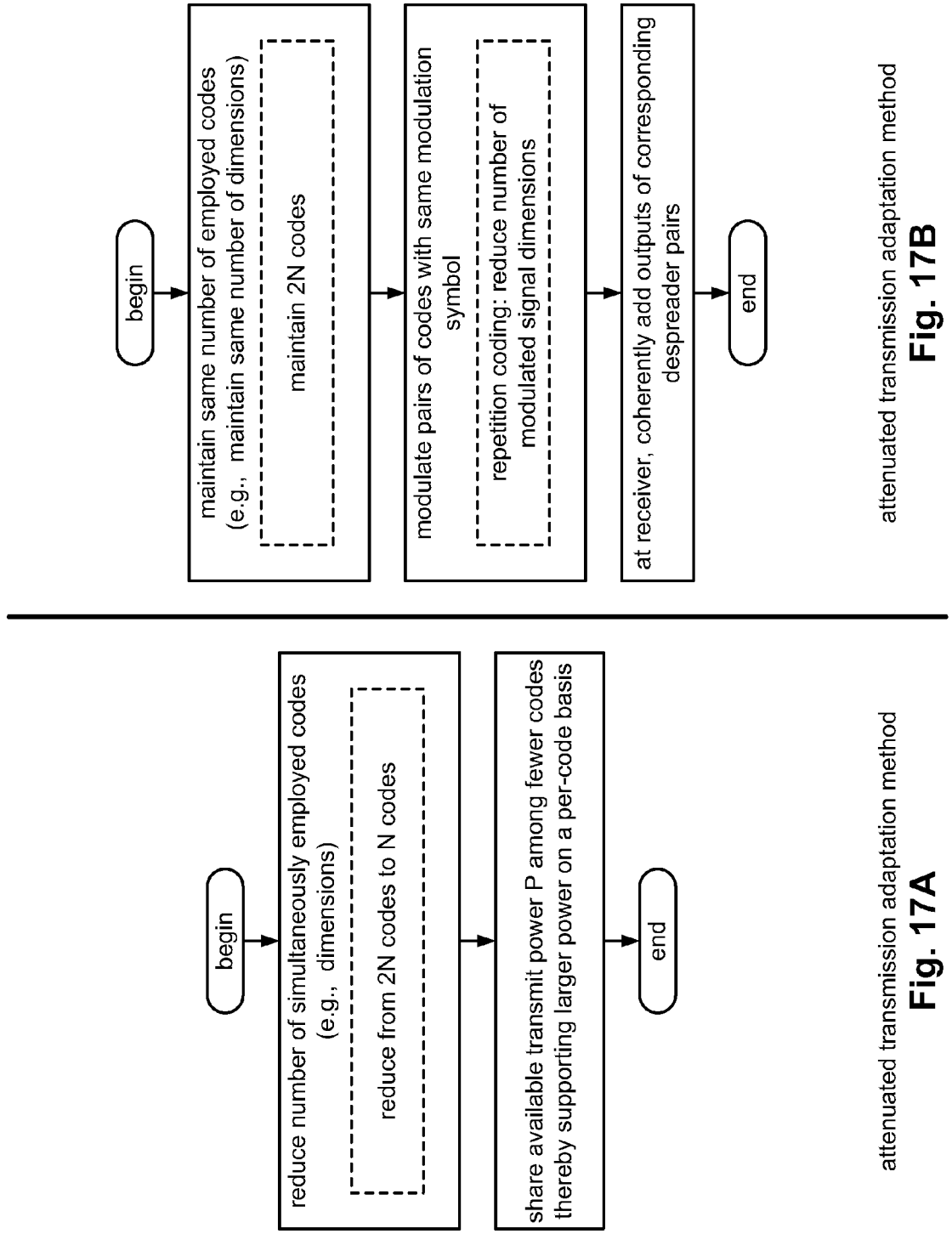

attenuated transmission adaptation method attenuated transmission adaptation method

SIGNAL PROCESSING UNDER ATTENUATED TRANSMISSION CONDITIONS

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 10/427,593, entitled "Signal processing under attenuated transmission conditions," filed May 1, 2003, pending, and scheduled to be issued as U.S. Pat. No. 7,529,289 on May 5, 2009, which claims priority pursuant to 35 U.S.C. §119(e) to the following U.S. Provisional patent application which is hereby incorporated herein by reference in its entirety and made part of the present U.S. Utility patent application for all purposes:

a. U.S. Provisional Application Ser. No. 60/416,889, entitled "Signal processing under attenuated transmission conditions," filed Oct. 8, 2002, now expired.

The U.S. Utility application Ser. No. 10/427,593 also claims priority pursuant to 35 U.S.C. §120, as a continuation-in-part (CIP), to the following U.S. Utility patent application which is hereby incorporated herein by reference in its entirety and made part of the present U.S. Utility patent application for all purposes:

1. U.S. Utility application Ser. No. 09/652,721, entitled "Subdimensional single carrier modulation," filed Aug. 31, 2000, now U.S. Pat. No. 6,778,611, issued Aug. 17, 2004, which claims priority pursuant to 35 U.S.C. §119(e) to the following U.S. Provisional patent application:

a. U.S. Provisional Application Ser. No. 60/151,680, entitled "Subdimensional single carrier modulation," filed Aug. 31, 1999, now expired.

The U.S. Utility application Ser. No. 10/427,593 also claims priority pursuant to 35 U.S.C. §120, as a continuation-in-part (CIP), to the following U.S. Utility patent application which is hereby incorporated herein by reference in its entirety and made part of the present U.S. Utility patent application for all purposes:

1. U.S. Utility application Ser. No. 10/142,189, entitled "Cancellation of interference in a communication system with application to S-CDMA," filed May 8, 2002, now U.S. Pat. No. 7,110,434, issued Sep. 19, 2006, which claims priority pursuant to 35 U.S.C. §119(e) to the following U.S. Provisional patent application:

a. U.S. Provisional Application Ser. No. 60/367,564, entitled "Cancellation of interference in a communication system with application to S-CDMA," filed Mar. 26, 2002, now expired.

BACKGROUND OF THE INVENTION

1. Technical Field of the Invention

The invention relates generally to communication systems; and, more particularly, it relates to communication systems that operate under attenuated transmission conditions.

2. Description of Related Art

The problems presented by attenuation of transmitted signals within communication systems have existed for quite some time. In many different types of communication systems, there may be an undesirable attenuation of a signal when being transmitted from a transmitter to a receiver through the infrastructure of the communication system. That is to say, a transmitter may experience a large attenuation of its transmitted signals when they travel to the receiver via the communication system.

In one type of communication system, a cable modem communication system, this path may be viewed as being an upstream or reverse path between a Cable Modem (CM) and a Cable Modem Termination System (CMTS), and/or the forward path of communication from the CMTS to any one or more CMs within the cable modem communication system.

In addition, within many communication system networks, there are a multitude of transmitter-to-receiver paths between the various devices, and there is a large variety of degrees of attenuation among all of those various paths. Some paths may have large attenuation, and some may not have so large an attenuation; there is a continuum of possible degrees of attenuation throughout the various paths within the communication system.

Referring back to the cable modem communication system (which is sometimes referred to as a cable plant), the Data Over Cable Service Interface Specification (DOCSIS) will typically govern the transmission and receipt of signals throughout the cable modem communication system. In this situation, some cable modems (CMs) may have greater attenuation than others over the transmission paths from their respective CM output to the cable headend (e.g., the CMTS contained therein). As a further example, in an apartment complex, there may be long runs of cable, including one or more splitters, connecting the various apartment units. Thus, the cabling itself from the CM may itself even introduce a large attenuation even before that particular CM cabling, within the apartment building, is attached to the rest of the cable plant.

These same effects may also be present within wireless communication systems. For example, within a wireless transmission path, where path length differences between the various devices within the system may vary greatly, with some transmitter-receivers being located relatively close and perhaps within a line-of-sight of a wireless termination system, while other transmitter-receivers may be located at a great distance from the wireless termination system and perhaps have an obscured line-of-sight and/or destructively interfering multipath.

While there are some prior art approaches to deal with the problems presented by undesirable attenuation of signals as they are transmitted through the communication system, these prior art approaches fail to address this large attenuation within the transmission path without also degrading the efficient operation for the full set of transmitters operating into a given receiver. For example, in the cable modem communication system context, these prior art approaches will themselves oftentimes introduce degradation of some, if not all, of the CMs as they transmit signals to the CMTS. In addition, these prior art approaches will typically significantly increase the complexity of the communication system's components. This increase in the complexity of the communication system's components, provided by the prior art approaches, is typically found in increases to the complexity of the Media Access Control (MAC) (sometimes referred to as the Medium Access Control) and Physical (PHY) layer components of the communication system.

One prior art means for satisfying the problem of one (or several) of the many transmitter-receiver links suffering excessive attenuation (or path loss) is to employ a receiver having certain flexibility in its operating characteristics. Such a flexible receiver would be capable of operating at a multitude of SNRs (Signal to Noise Ratios) in the network environment. The flexible receiver quickly adjusts from high SNR reception to low SNR reception and/or vice-versa, and it would utilize a MAC layer which efficiently manipulates and allocates access to the network while factoring in the variation throughput which necessarily accompanies the variety of SNRs across the various links within the communication system. These system level concepts have been proposed for this problem already in the prior art, especially in the wireless environment, under the moniker of multi-channel multipoint distribution service (MMDS) Adaptive Modulation approach. However, a major drawback of many such Adaptive Modulation approaches is the typically immense complexity associated therewith, especially, but not solely, when resolving the MAC layer issues.

In addition, within many communication systems, there is a requirement that all transmitters be constrained to use the same modulation parameters. This may be because the receiver is limited to receiving signals using that common set of modulation parameters or characteristics. As mentioned above, the prior art approach of providing such rapidly changing receiver flexibility at the PHY layer and at the MAC layer is not without a significant increase in complexity. These parameters may include the modulation order (QPSK (Quadrature Phase Shift Keying), 16 QAM (Quadrature Amplitude Modulation), 64 QAM, etc.), the FEC (Forward Error Correction) parameters (RS (Reed Solomon) codeword length N and number of correctable bytes T), and other parameters as well.

In a communication system lacking such an extremely sophisticated and flexible PHY and MAC layer, if one of the transmitters is disadvantaged and unable to communicate using the particular modulation order at hand, such as 64 QAM, then this would cause a reduction of the modulation order on the entire channel to a lower order prescribed modulation that all of the transmitters can accommodate. For example, this could involve reducing the modulation order from 64 QAM to 32 QAM, in one instance, or to an even lower modulation order as dictated by the highly attenuated and problematic transmitter-receiver path. Therefore, in doing so, all of the transmitters need to be reduced to the lower order modulation; it would require reducing all of the transmitters to 32 QAM in this example. This would undesirably reduce the raw throughput of the communication channel (bits per second) by a ratio of 5/6. Clearly, there are situations where the reduction of modulation order may be even more significant and the throughput of the communication channel would be even more affected.

Another problem that often arises in such communication systems is an upper limit on the power that a particular transmitter is capable of using, or is permitted to use, to transmit its information. Such an upper power limit may be imposed by the capabilities of economically implemented transmit amplifiers which are allocated to have a certain maximum transmit power given a spurious fidelity requirement that must be met. In addition, the regulatory agencies (e.g., the Federal Communications Commission (FCC)) may also impose a limit on transmit power to prevent interference with other services operating within other frequency spectra. In addition, in some systems, there is a nonlinear element in the communication channel which limits the power that can be passed through the communication channel. In the case of a cable modem communication system, one potential source of nonlinearity may be an upstream laser which will clips signals above a certain maximum power level.

One prior art approach that seeks to deal with these deficiencies is to increase the transmitted power of a transmitter up to a certain point so as to overcome the high attenuation of its transmitter-receiver transmission path. However, because of the inherent limitations of the device, the transmitter can not increase its power beyond an upper limit point, as described above. Again, this upper transmitted power limit could be due to standards, wherein the limitations are attempting to allow coexistence with other communications networks or broadcasts, such as wireless systems. Alternatively, the upper transmitted power limit may be caused by agreed-upon practical or cost-effective limits (as in DOCSIS), or they could be a combination of these factors. This power limitation, regardless of which source introduces it, inherently presents a limit by which this prior art approach can employ the increasing of transmitted power to address this problem.

Yet another problem that arises in such communication system is a problem associated with the multipoint-to-point connectivity within communication systems. A transmitter may need to enter the network (e.g., range and register) before it can communicate in a normal manner within the communication system. The attenuated transmission conditions may simply make prior art approaches to perform this ranging and registering impossible, given the oftentimes relatively low SNR on the communication channel of interest on which the ranging and registering is to be performed.

Also along these lines of a communication system having a communication channel that is extremely attenuated, in many multipoint-to-point communication systems, a head-end receiver (e.g., a CMTS of a cable headend in a cable modem communication system) must adjust the transmission parameters of the transmitters (e.g., the CMs in a cable modem communication system) based on transmissions (such as ranging bursts) from the transmitters to the receiver. That is, the transmitter must send a ranging burst to the receiver, and the receiver must make measurements on the ranging burst and determine adjustments, if any, to one or more of the transmitter's operational parameters. These transmitter operational parameters may include timing offset, frequency offset, power, equalizer coefficients, among other parameters. However, in an attenuated channel, the ranging burst itself is likely to have a significantly reduced SNR upon arrival at the receiver. This will again make the ranging and registering of the transmitter challenging. Even if the ranging and registering of the transmitter may be performed, it is likely to be made with significant error given the significantly reduced SNR of the ranging burst upon arrival at the receiver.

Therefore, there does not presently exist, in the art, a means by which a transmitter can overcome a severe attenuation in its transmission path to the receiver and thereby maintain reliable operation at the receiver. As such, no prior art solution is able to address the even more complicated situation that arises within multipoint-to-point communication systems having numerous reflections, additional paths, etc. contained throughout the communication system.

In addition, the prior art does not presently provide a solution by which a transmitter can overcome a severe attenuation in its path to the receiver and still maintain a desired SNR at the receiver. The prior art also presents no solution by which a transmitter can increase the SNR at the receiver without increasing its transmitted signal power beyond the certain/predetermined limit as described above.

There also does not presently exist, in the art, a means by which a transmitter can reduce its own throughput while retaining its assigned modulation parameters, and hence not require the other transmitters on the communication channel to reduce their throughput as well.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 8A is a system diagram illustrating embodiment of a uni-directional communication system that is built according to the invention.

FIG. 8B is a system diagram illustrating embodiment of a bi-directional communication system that is built according to the invention.

FIG. 8C is a system diagram illustrating embodiment of a one to many communication system that is built according to the invention.

FIG. 10A is a diagram illustrating logical channel partitioning of a portion of spectrum that is performed according to the invention.

FIG. 10B is a diagram illustrating an embodiment of logical channel partitioning of Synchronous Code Division Multiple Access (S-CDMA) codes in a Data Over Cable Service Interface Specification (DOCSIS) system that is performed according to the invention.

FIG. 17A, FIG. 17B, FIG. 18A, and FIG. 18B are operational flow diagrams illustrating embodiments of attenuated transmission adaptation methods that are performed according to the invention.

DETAILED DESCRIPTION OF THE INVENTION

Figure 1:
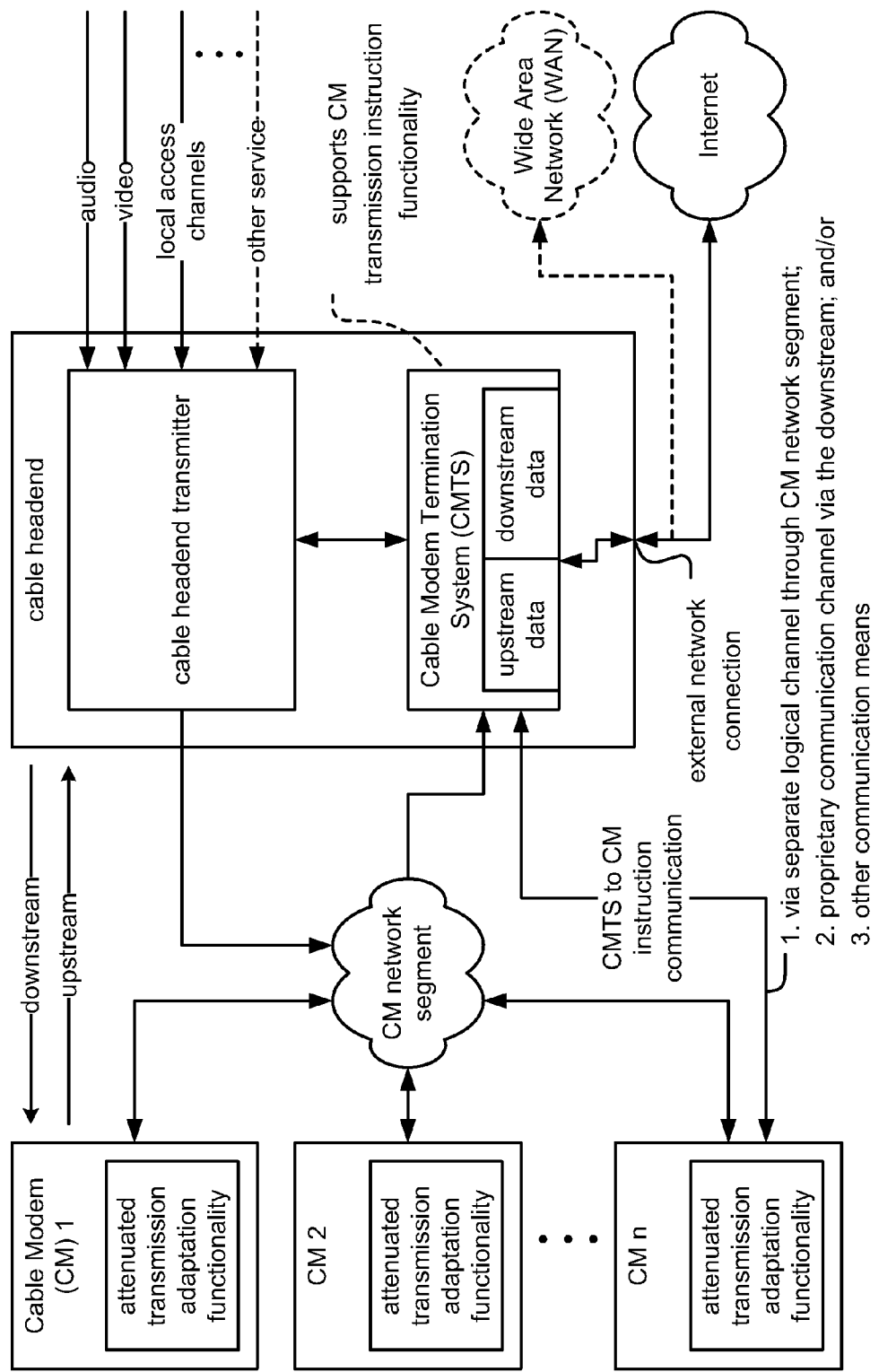
FIG. 1 is a system diagram illustrating an embodiment of a cable modem communication system that is built according to the invention.

Various aspects of the invention address the many deficiencies of the prior art when dealing with a large attenuation in the path from a transmitter to a receiver. The invention is able to provide, among other benefits, a solution that allows optimal use of bandwidth within a communication system. In the presence of insufficient SNR, a transmitter may reduce its throughput or bits per second, (and thus attempt reliable communications) in either of two ways: by reducing its constellation order, for example, from 64 QAM to QPSK, or by reducing the bandwidth—or number of signaling dimensions per time interval—that it employs.

Reducing constellation order (bits per symbol) decreases the SNR required at the receiver for reliable communications. However, by doing so, it also reduces the throughput efficiency (bits per second per Hertz (Hz)) of the overall communications channel. This may be problematic, in that, the PHY operational parameters are typically shared among ALL of the transmitters on the same channel. Therefore, this choice, by itself, will provide some improved performance, yet it is not particularly attractive. The other option of reducing the number of signaling dimensions per time interval—for the transmitters with insufficient SNR in "normal" operation—remains. Reducing the number of signaling dimensions allocated per time interval for selected transmitters solves the insufficient SNR problem but at the expense of reduced channel throughput.

However, when dealing with the real limitation of maximum possible transmit power of a device (the limitation may be caused by a variety of reasons, some of which are described above), it is found that reducing the number of signaling dimensions combined with keeping the transmit power at a maximum (in one embodiment), does in fact increase the SNR per dimension (or per symbol) at the receiver. In addition, other embodiments of the invention envision reducing the number of signaling dimensions combined with intelligently modifying the transmit power in an effort to increase the SNR per dimension (or per symbol) at the receiver.

Therefore, the appropriate reduction in the number of allocated signaling dimensions for a disadvantaged transmitter, while modifying the allowed transmit power (setting it to a maximum in one embodiment), provides that the SNR per dimension at the receiver can be brought up to the level achieved by the more typical transmitters within the communication system whose transmitter-receiver links are not disadvantaged by severe attenuation.

Therefore, this combination technique provides a solution for many of the deficiencies described above, namely, by ensuring that a similar SNR is working into the receiver for all of the transmitters of the system, and that similar PHY layer operational parameters may be employed for all of the transmitters. Hence, the invention provides, among other benefits, a means by which a transmitter can maintain the desired SNR at the receiver while not decreasing the overall throughput or throughput efficiency of the entire communication channel. By maintaining the SNR at the receiver, the difficulties of the flexible PHY receiver are eliminated, and the difficulties of the associated MAC layer are greatly reduced as well. Other details, benefits, and aspects of the invention are also described in more detail below.

FIGS. 1, 2, 3, 4, 5A, 5B, 5C, 6A, 6B, 7A, 7B, 8A, 8B, 8C, and 9 illustrate a number of communication system context embodiments where various aspects of the invention may be implemented.

FIG. 1 is a system diagram illustrating an embodiment of a cable modem communication (CM) system 100 that is built according to the invention. The CM communication system 100 includes a number of CMs that may be used by different users (shown as a CM 1, a CM 2, . . . , and a CM n) and a cable headend that includes a Cable Modem Termination System (CMTS) and a cable headend transmitter. The CMTS is a component that exchanges digital signals with CMs on a cable network.

Each of the CMs (shown CM 1, CM 2, . . . , and CM n) is operable to communicatively couple to a Cable Modem (CM) network segment. A number of elements may be included within the CM network segment. For example, routers, splitters, couplers, relays, and amplifiers may be contained within the CM network segment without departing from the scope and spirit of the invention.

The CM network segment allows communicative coupling between a CMs and a cable headend that includes the cable modem headend transmitter and the CMTS. The CMTS may be located at a local office of a cable television company or at another location within a CM communication system. The cable headend transmitter is able to provide a number of services including those of audio, video, local access channels, as well as any other service known in the art of cable systems. Each of these services may be provided to the one or more CMs (shown as a CM 1, CM 2, . . . , and CM n).

In addition, through the CMTS, the CMs are able to transmit and receive data from the Internet and/or any other network to which the CMTS is communicatively coupled via an external network connection. The operation of a CMTS, at the cable-provider's head-end, may be viewed as providing analogous functions that are provided by a digital subscriber line access multiplexor (DSLAM) within a digital subscriber line (DSL) system. The CMTS takes the traffic coming in from a group of customers on a single channel and routes it to an Internet Service Provider (ISP) for connection to the Internet, as shown via the external network connection that communicatively couples to the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (specifically, the CM 1, CM 2, . . . , and CM n), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention. In addition, a Japanese DOCSIS specification is also currently under development, and the invention is operable within the Japanese DOCSIS specification as well.

The downstream information flows to any one or more of the connected CMs (shown as the CM 1, CM 2, . . . , and CM n). The individual network connection, within the CM network segment, decides whether a particular block of data is intended for that particular CM or not. On the upstream side, information is sent from the CMs (shown as the CM 1, CM 2, . . . , and CM n) to the CMTS; on this upstream transmission, the CMs (shown as the CM 1, CM 2, . . . , and CM n) to which the data is not intended do not see that data at all.

As an example of the capabilities provided by a CMTS, the CMTS will enable as many as 1,000 users to connect to the Internet through a single 6 MHz channel. Since a single channel is capable of 30-40 Mbps (mega-bits per second) of total throughput, this means that users may see far better performance than is available with standard dial-up modems that may be used to access external networks such as the Internet. Some embodiments implementing the invention are described below and in the various Figures that show the data handling and control within one or both of a CM and a CMTS within a CM system that operates by employing CDMA (Code Division Multiple Access) and/or S-CDMA (Synchronous Code Division Multiple Access).

The CMs (shown as the CM 1, CM 2, . . . , and CM n) and the CMTS communicate synchronization information to one another to ensure proper alignment of transmission from the CMs to the CMTS. This is where the synchronization of the S-CDMA communication systems is extremely important. When a number of the CMs all transmit their signals at a same time such that these signals are received at the CMTS on the same frequency and at the same time, they must all be able to be properly de-spread and decoded for proper signal processing.

Each of the CMs (shown as the CM 1, CM 2, . . . , and CM n) is located a respective transmit distance from the CMTS. In order to achieve optimum spreading diversity and orthogonality for the CMs (shown as the CM 1, CM 2, . . . , and CM n) when transmitting to the CMTS, each of the CM transmissions must be synchronized so that it arrives, from the perspective of the CMTS, synchronous with other CM transmissions. In order to achieve this goal, for a particular transmission cycle, each of the CMs typically transmits to the CMTS at a respective transmission time, which will likely differ from the transmission times of other CMs. These differing transmission times will be based upon the relative transmission distance between the CM and the CMTS. These operations may be supported by the determination of the round trip delays (RTPs) between the CMTS and each supported CM. With these RTPs determined, the CMs may then determine at what point to transmit their S-CDMA data so that all CM transmissions will arrive synchronously at the CMTS.

The invention employs attenuated transmission adaptation functionality within one or more of the CMs (shown as the CM 1, CM 2, . . . , and CM n). In some embodiments, the CMTS is able to support CM transmission instruction functionality such that the CMTS will direct the CM to perform certain adaptation of the manner in which the CM transmits information upstream to the CMTS; this situation may be viewed as being an embodiment where the CMTS has access to information (such the Signal to Noise Ratio (SNR) of the communication link from the CM to the CMTS, the cable modem communication system's operating conditions, and/or other information) that it is able intelligently to make such decisions regarding the manner in which the CM transmits information upstream to the CMTS. The communication of instructions to and from the CMs and the CMTS may be performed using a variety of means including: 1. via a separate logical channel through the CM network segment, 2. via a proprietary communication channel via the downstream transmission direction from the CMTS to the CMs, and/or 3. via any other communication means.

Figure 2:
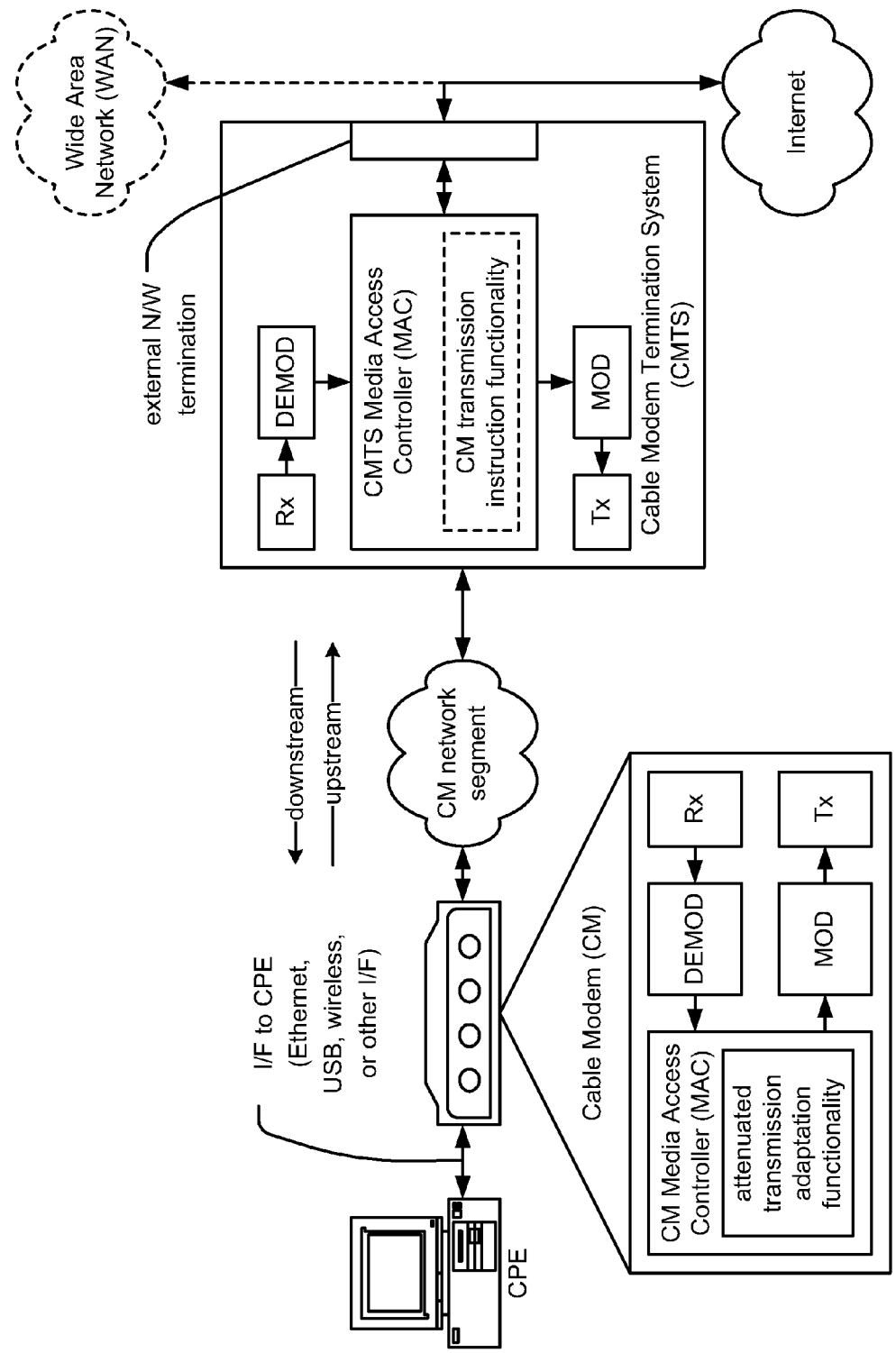
FIG. 2 is a system diagram illustrating another embodiment of a cable modem communication system that is built according to the invention.

FIG. 2 is a system diagram illustrating another embodiment of a cable modem communication system 200 that is built according to the invention. From certain perspectives, the FIG. 2 may be viewed as a communication system allowing bi-directional communication between a customer premise equipment (CPE) and a network. In some embodiments, the CPE is a personal computer or some other device allowing a user to access an external network. The CM and the CPE may be communicatively coupled via a number of possible means, including an Ethernet interface, a USB (Universal Serial Bus) interface, a wireless interface, and/or some other interface. The external network may be the Internet itself, or, alternatively a wide area network (WAN). For example, the CM communication system 200 is operable to allow Internet protocol (IP) traffic to achieve transparent bi-directional transfer between a CMTS-network side interface (CMTS-NSI: viewed as being between the CMTS and the Internet) and a CM to CPE interface (CMCI: viewed as being between the Cable Modem (CM) and the CPE).

The Internet, and/or the WAN, is/are communicatively coupled to the CMTS via the CMTS-NSI. The CMTS is operable to support the external network termination, for one or both of the WAN and the Internet. The CMTS includes a modulator and a demodulator to support transmitter and receiver functionality to and from a CM network segment. A CMTS Media Access Controller (MAC) in interposed between the modulator and a demodulator of the CMTS that is operable to support CM transmission instruction functionality in some embodiments. In addition, the CM includes a modulator and a demodulator to support transmitter and receiver functionality to and from a CM network segment. A CM Media Access Controller (MAC) in interposed between the modulator and a demodulator of the CM that is operable to support attenuated transmission adaptation functionality.

A number of elements may be included within the CM network segment. For example, routers, splitters, couplers, relays, and amplifiers may be contained within the CM network segment without departing from the scope and spirit of the invention. The CM network segment allows communicative coupling between a CM user and the CMTS.

The FIG. 1 and the FIG. 2 show just two embodiments where the various aspects of the invention may be implemented. Several other embodiments are described as well.

Figure 3:
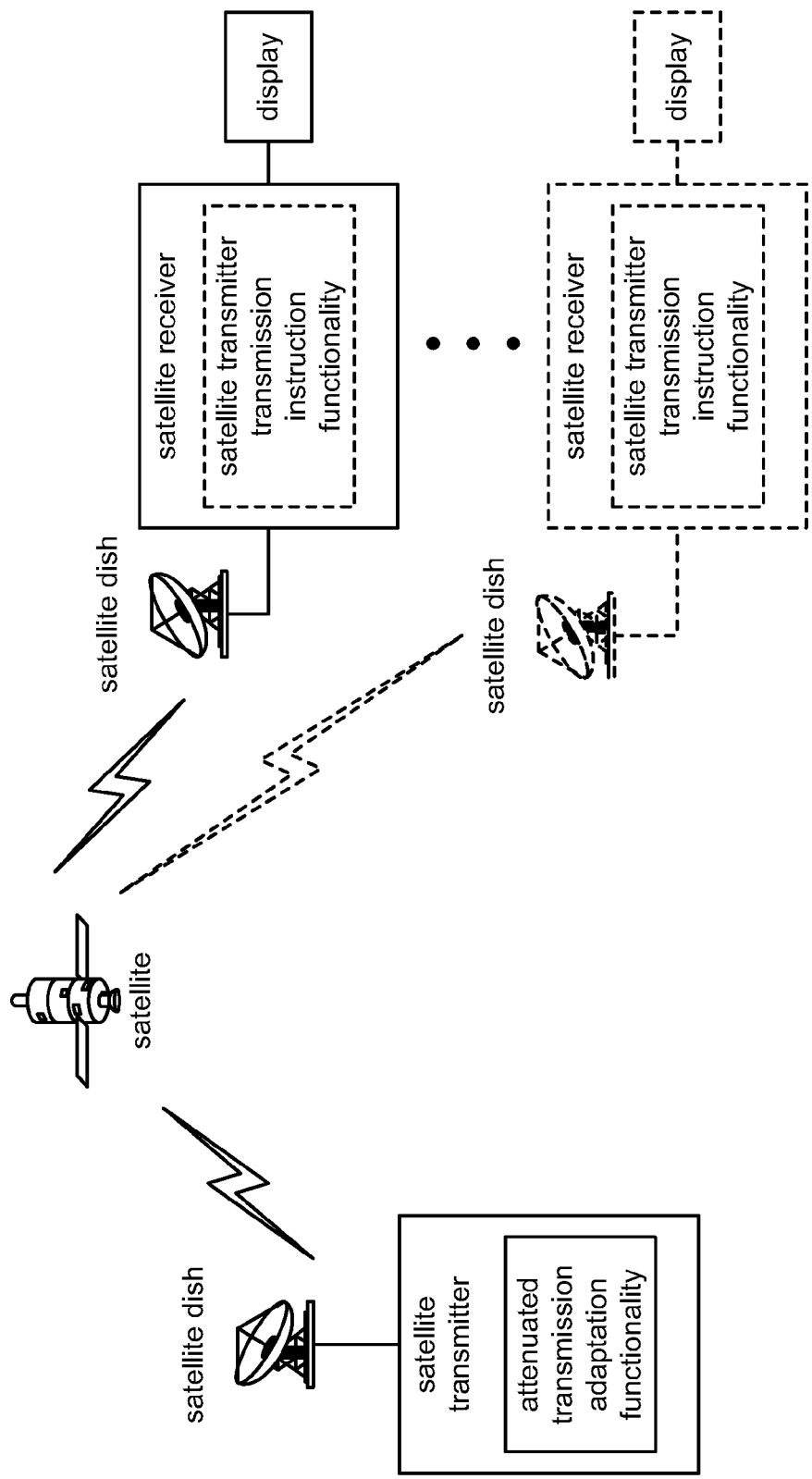
FIG. 3 is a system diagram illustrating an embodiment of a satellite communication system that is built according to the invention.

FIG. 3 is a system diagram illustrating an embodiment of a satellite communication system that is built according to the invention. A satellite transmitter is communicatively coupled to a satellite dish that is operable to communicate with a satellite. The satellite transmitter may also be communicatively coupled to a wired network. This wired network may include any number of networks including the Internet, proprietary networks, and/or other wired networks. The satellite transmitter employs the satellite dish to communicate to the satellite via a wireless communication channel. The satellite is able to communicate with one or more satellite receivers, shown as satellite receivers (each having a satellite dish). Each of the satellite receivers may also be communicatively coupled to a display.

Here, the communication to and from the satellite may cooperatively be viewed as being a wireless communication channel, or each of the communication to and from the satellite may be viewed as being two distinct wireless communication channels.

For example, the wireless communication "channel" may be viewed as not including multiple wireless hops in one embodiment. In other embodiments, the satellite receives a signal received from the satellite transmitter (via its satellite dish), amplifies it, and relays it to satellite receiver (via its satellite dish); the satellite receiver may also be implemented using terrestrial receivers such as satellite receivers, satellite based telephones, and/or satellite based Internet receivers, among other receiver types. In the case where the satellite receives a signal received from the satellite transmitter (via its satellite dish), amplifies it, and relays it, the satellite may be viewed as being a "transponder." In addition, other satellites may exist that perform both receiver and transmitter operations in cooperation with the satellite. In this case, each leg of an up-down transmission via the wireless communication channel would be considered separately.

In whichever embodiment, the satellite communicates with the satellite receiver. The satellite receiver may be viewed as being a mobile unit in certain embodiments (employing a local antenna); alternatively, the satellite receiver may be viewed as being a satellite earth station that may be communicatively coupled to a wired network in a similar manner in which the satellite transmitter may also be communicatively coupled to a wired network.

The satellite transmitter is operable to support attenuated transmission adaptation functionality according to the invention. Each of the satellite receivers is operable, in certain embodiments, to support satellite transmission instruction functionality such that a satellite receiver is capable to instruct the satellite transmitter regarding how the satellite transmitter is to change its transmission operating parameters.

The FIG. 3 shows yet another of the many embodiments where attenuated transmission adaptation functionality is supported at a transmitter end of a communication system and transmission instruction functionality may sometimes be supported at the receiver end of the communication channel.

Figure 4:
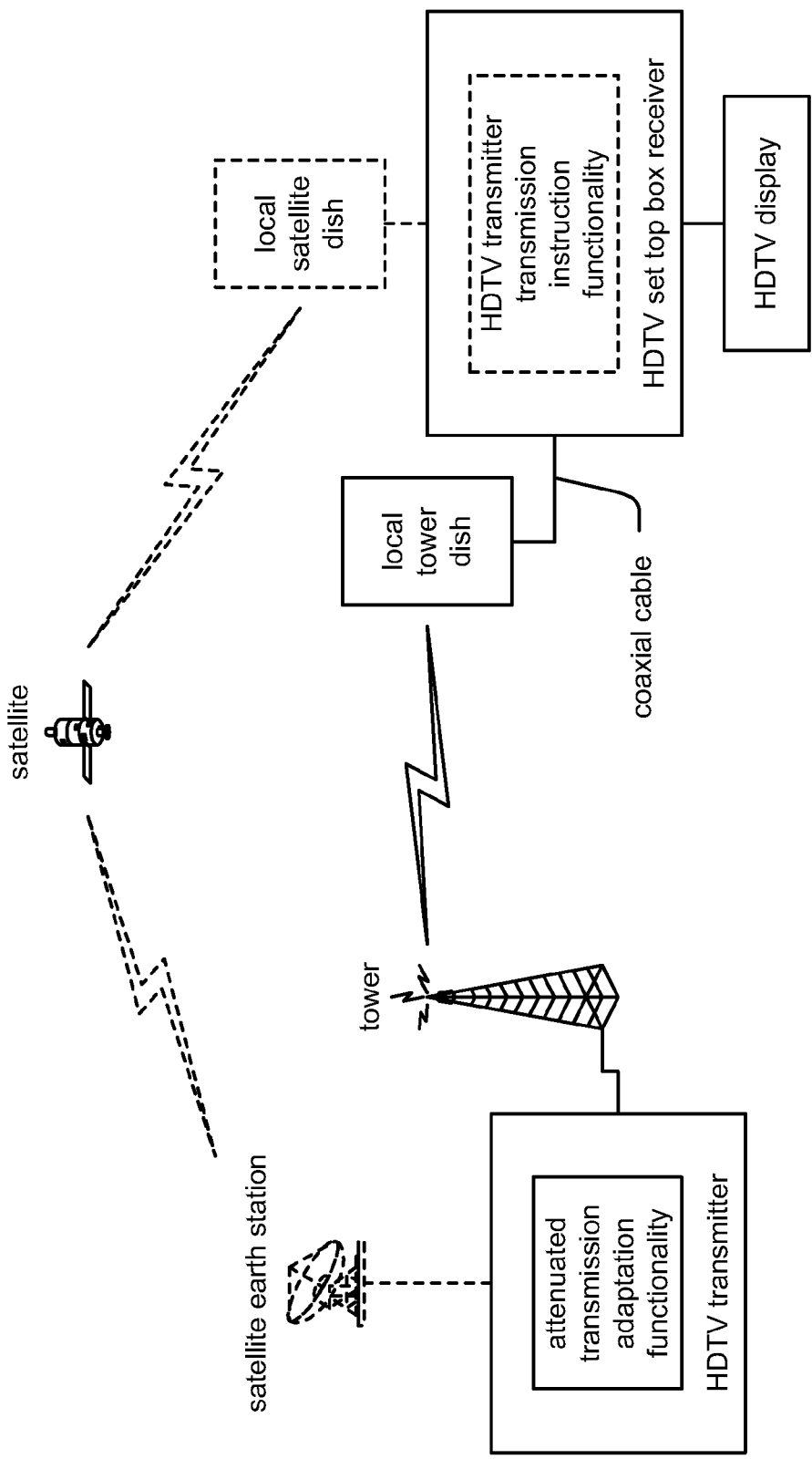
FIG. 4 is a system diagram illustrating an embodiment of a High Definition Television (HDTV) communication system that is built according to the invention.

FIG. 4 is a system diagram illustrating an embodiment of a High Definition Television (HDTV) communication system that is built according to the invention. An HDTV transmitter is communicatively coupled to a tower. The HDTV transmitter, using its tower, transmits a signal to a local tower dish via a wireless communication channel. The local tower dish communicatively couples to an HDTV set top box receiver via a coaxial cable. The HDTV set top box receiver includes the functionality to receive the wireless transmitted signal that has been received by the local tower dish; this may include any transformation and/or down-converting as well to accommodate any up-converting that may have been performed before and during transmission of the signal from the HDTV transmitter and its tower.

The HDTV set top box receiver is also communicatively coupled to an HDTV display that is able to display the demodulated and decoded wireless transmitted signals received by the HDTV set top box receiver and its local tower dish. The HDTV transmitter (via its tower) transmits a signal directly to the local tower dish via the wireless communication channel in this embodiment. In alternative embodiments, the HDTV transmitter may first receive a signal from a satellite, using a satellite earth station that is communicatively coupled to the HDTV transmitter, and then transmit this received signal to the to the local tower dish via the wireless communication channel. In this situation, the HDTV transmitter operates as a relaying element to transfer a signal originally provided by the satellite that is destined for the HDTV set top box receiver. For example, another satellite earth station may first transmit a signal to the satellite from another location, and the satellite may relay this signal to the satellite earth station that is communicatively coupled to the HDTV transmitter. The HDTV transmitter performs receiver functionality and then transmits its received signal to the local tower dish.

In even other embodiments, the HDTV transmitter employs its satellite earth station to communicate to the satellite via a wireless communication channel. The satellite is able to communicate with a local satellite dish; the local satellite dish communicatively couples to the HDTV set top box receiver via a coaxial cable. This path of transmission shows yet another communication path where the HDTV set top box receiver may communicate with the HDTV transmitter.

In whichever embodiment and whichever signal path the HDTV transmitter employs to communicate with the HDTV set top box receiver, the HDTV set top box receiver is operable to receive communication transmissions from the HDTV transmitter.

The HDTV transmitter is operable to support attenuated transmission adaptation functionality according to the invention. The HDTV set top box receiver is operable, in certain embodiments, to support HDTV transmitter transmission instruction functionality such that the HDTV set top box receiver is capable to instruct the HDTV transmitter regarding how the HDTV transmitter is to change its transmission operating parameters.

The FIG. 4 shows yet another of the many embodiments where attenuated transmission adaptation functionality is supported at a transmitter end of a communication system and transmission instruction functionality may sometimes be supported at the receiver end of the communication channel.

Figure 5A:
FIG. 5A and FIG. 5B are system diagrams illustrating embodiment of uni-directional cellular communication systems that are built according to the invention.
Figure 5B:

FIG. 5A and FIG. 5B are system diagrams illustrating embodiment of uni-directional cellular communication systems that are built according to the invention.

Referring to the FIG. 5A, a mobile transmitter includes a local antenna communicatively coupled thereto. The mobile transmitter may be any number of types of transmitters including a one way cellular telephone, a wireless pager unit, a mobile computer having transmit functionality, or any other type of mobile transmitter. The mobile transmitter transmits a signal, using its local antenna, to a cellular tower via a wireless communication channel. The cellular tower is communicatively coupled to a base station receiver; the receiving tower is operable to receive data transmission from the local antenna of the mobile transmitter that has been communicated via the wireless communication channel. The cellular tower communicatively couples the received signal to the base station receiver.

The mobile transmitter is operable to support attenuated transmission adaptation functionality according to the invention. The base station receiver is operable, in certain embodiments, to support transmission instruction functionality such that the base station receiver is capable to instruct the mobile transmitter regarding how the mobile transmitter is to change its transmission operating parameters. The FIG. 5A shows a uni-directional cellular communication system where the communication goes from the mobile transmitter to the base station receiver via the wireless communication channel.

Referring to the FIG. 5B, a base station transmitter includes a cellular tower communicatively coupled thereto. The base station transmitter, using its cellular tower, transmits a signal to a mobile receiver via a communication channel. The mobile receiver may be any number of types of receivers including a one-way cellular telephone, a wireless pager unit, a mobile computer having receiver functionality, or any other type of mobile receiver. The mobile receiver is communicatively coupled to a local antenna; the local antenna is operable to receive data transmission from the cellular tower of the base station transmitter that has been communicated via the wireless communication channel. The local antenna communicatively couples the received signal to the mobile receiver.

The base station transmitter is operable to support attenuated transmission adaptation functionality according to the invention. The mobile receiver is operable, in certain embodiments, to support transmission instruction functionality such that the mobile receiver is capable to instruct the base station transmitter regarding how the base station transmitter is to change its transmission operating parameters. The FIG. 5B shows a uni-directional cellular communication system where the communication goes from the base station transmitter to the mobile receiver via the wireless communication channel.

Figure 5C:
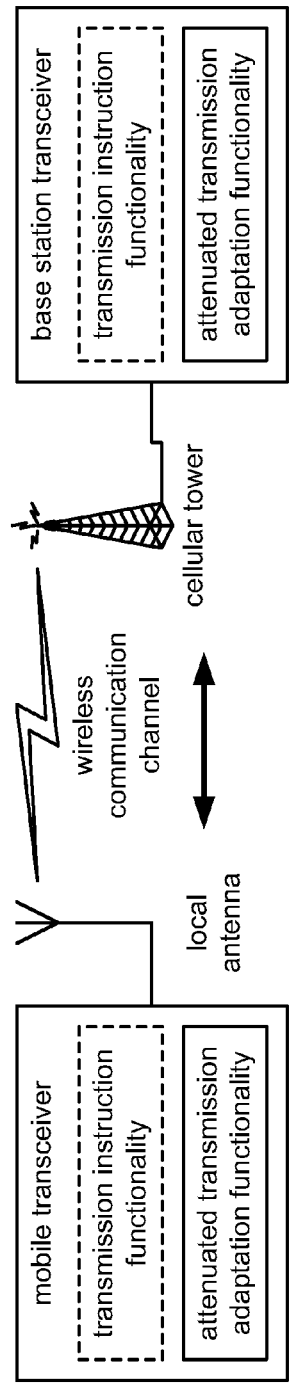
FIG. 5C is a system diagram illustrating embodiment of a bi-directional cellular communication system that is built according to the invention.

The FIG. 5C shows a bi-directional cellular communication system where the communication can go to and from the base station transceiver and to and from the mobile transceiver via the wireless communication channel.

Referring to the FIG. 5C, a base station transceiver includes a cellular tower communicatively coupled thereto. The base station transceiver, using its cellular tower, transmits a signal to a mobile transceiver via a communication channel. The reverse communication operation may also be performed. The mobile transceiver is able to transmit a signal to the base station transceiver as well. The mobile transceiver may be any number of types of transceiver including a cellular telephone, a wireless pager unit, a mobile computer having transceiver functionality, or any other type of mobile transceiver. The mobile transceiver is communicatively coupled to a local antenna; the local antenna is operable to receive data transmission from the cellular tower of the base station transceiver that has been communicated via the wireless communication channel. The local antenna communicatively couples the received signal to the mobile transceiver.

The base station transceiver is operable to support attenuated transmission adaptation functionality according to the invention as well as transmission instruction functionality, in certain embodiments, such that the base station transceiver is capable to instruct the mobile transceiver regarding how the mobile transceiver is to change its transmission operating parameters.

Similarly, the mobile transceiver is operable, in certain embodiments, to support transmission instruction functionality such that the mobile transceiver is capable to instruct the base station transceiver regarding how the base station transceiver is to change its transmission operating parameters.

The FIG. 5A, the FIG. 5B, and the FIG. 5C show yet more embodiments where attenuated transmission adaptation functionality is supported at the transmitter capable end (or ends) of a communication system and transmission instruction functionality may sometimes be supported at the receiver capable end (or ends) of the communication channel.

Figure 6A:
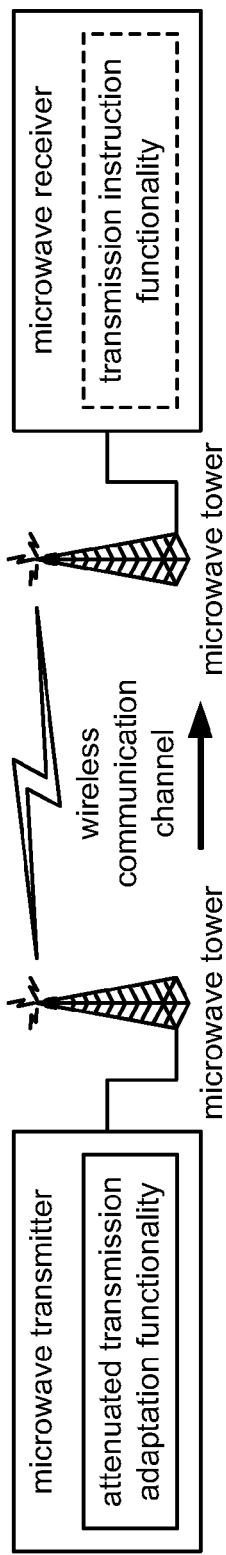
FIG. 6A is a system diagram illustrating embodiment of a uni-directional microwave communication system that is built according to the invention.

FIG. 6A is a system diagram illustrating embodiment of a uni-directional microwave communication system that is built according to the invention. A microwave transmitter is communicatively coupled to a microwave tower. The microwave transmitter, using its microwave tower, transmits a signal to a microwave tower via a wireless communication channel. A microwave receiver is communicatively coupled to the microwave tower. The microwave tower is able to receive transmissions from the microwave tower that have been communicated via the wireless communication channel.

The microwave transmitter is operable to support attenuated transmission adaptation functionality according to the invention. The microwave receiver is operable, in certain embodiments, to support transmission instruction functionality such that the microwave receiver is capable to instruct the microwave transmitter regarding how the microwave transmitter is to change its transmission operating parameters.

The FIG. 6A shows yet another of the many embodiments where attenuated transmission adaptation functionality is supported at a transmitter end of a communication system and transmission instruction functionality may sometimes be supported at the receiver end of the communication channel.

Figure 6B:
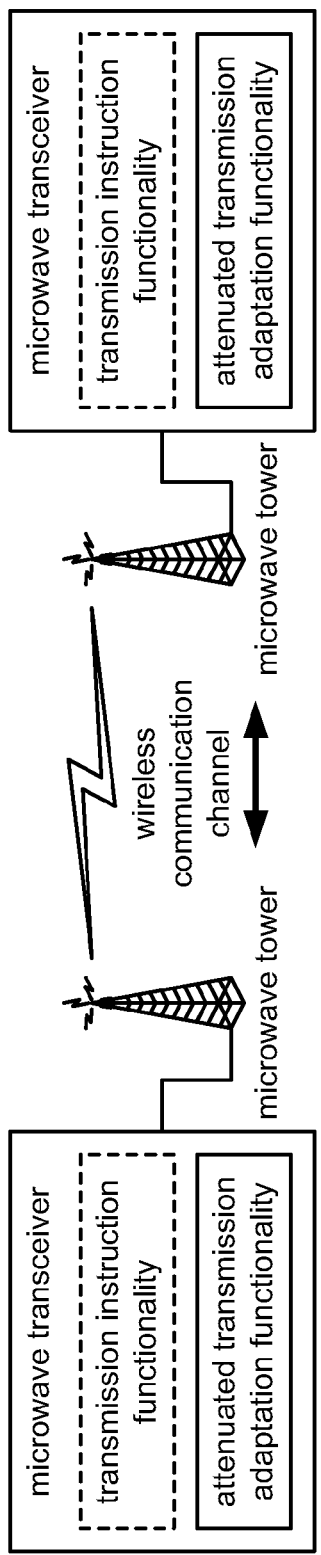
FIG. 6B is a system diagram illustrating embodiment of a bi-directional microwave communication system that is built according to the invention.

FIG. 6B is a system diagram illustrating embodiment of a bi-directional microwave communication system that is built according to the invention. Within the FIG. 6B, a first microwave transceiver is communicatively coupled to a first microwave tower. The first microwave transceiver, using the first microwave tower (the first microwave transceiver's microwave tower), transmits a signal to a second microwave tower of a second microwave transceiver via a wireless communication channel. The second microwave transceiver is communicatively coupled to the second microwave tower (the second microwave transceiver's microwave tower). The second microwave tower is able to receive transmissions from the first microwave tower that have been communicated via the wireless communication channel. The reverse communication operation may also be performed using the first and second microwave transceivers.

Each of the microwave transceivers is operable to support attenuated transmission adaptation functionality according to the invention. In addition, each of the microwave transceivers is operable, in certain embodiments, to support transmission instruction functionality such that one of the microwave transceivers is capable to instruct the other microwave transceiver regarding how that microwave transceiver is to change its transmission operating parameters to the other microwave transceiver.

The FIG. 6A and the FIG. 6B show yet more embodiments where attenuated transmission adaptation functionality is supported at the transmitter capable end (or ends) of a communication system and transmission instruction functionality may sometimes be supported at the receiver capable end (or ends) of the communication channel.

Figure 7A:
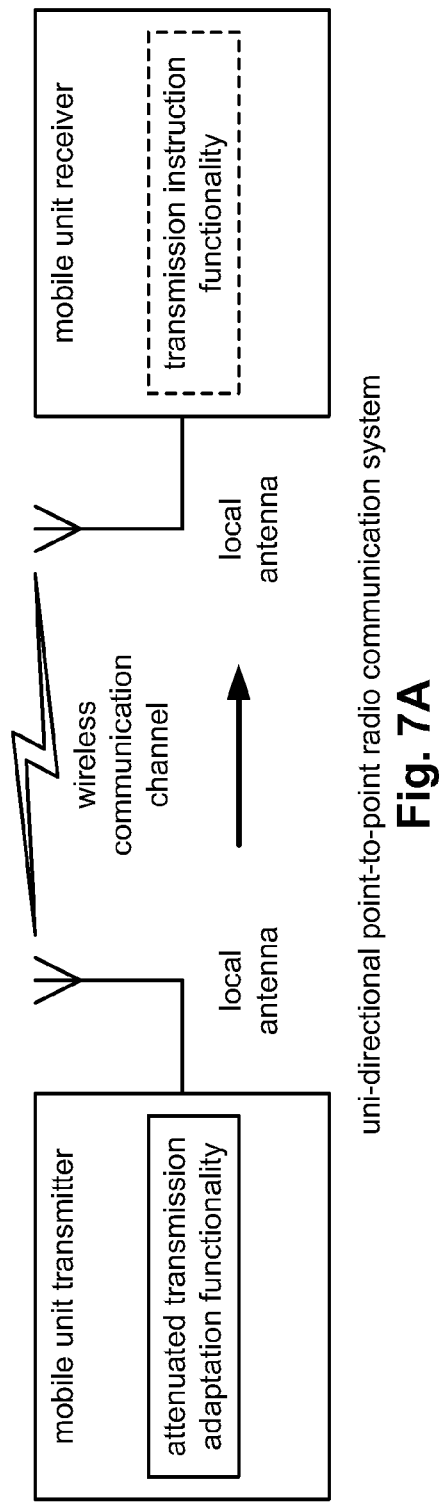
FIG. 7A is a system diagram illustrating embodiment of a uni-directional point-to-point radio communication system that is built according to the invention.

FIG. 7A is a system diagram illustrating embodiment of a uni-directional point-to-point radio communication system that is built according to the invention. A mobile unit transmitter includes a local antenna communicatively coupled thereto. The mobile unit transmitter, using its local antenna, transmits a signal to a local antenna of a mobile unit receiver via a wireless communication channel.

The mobile unit transmitter is operable to support attenuated transmission adaptation functionality according to the invention. In addition, the mobile unit receiver is operable, in certain embodiments, such that the mobile unit receiver is capable to instruct the mobile unit transmitter regarding how the mobile unit transmitter is to change its transmission operating parameters.

Figure 7B:
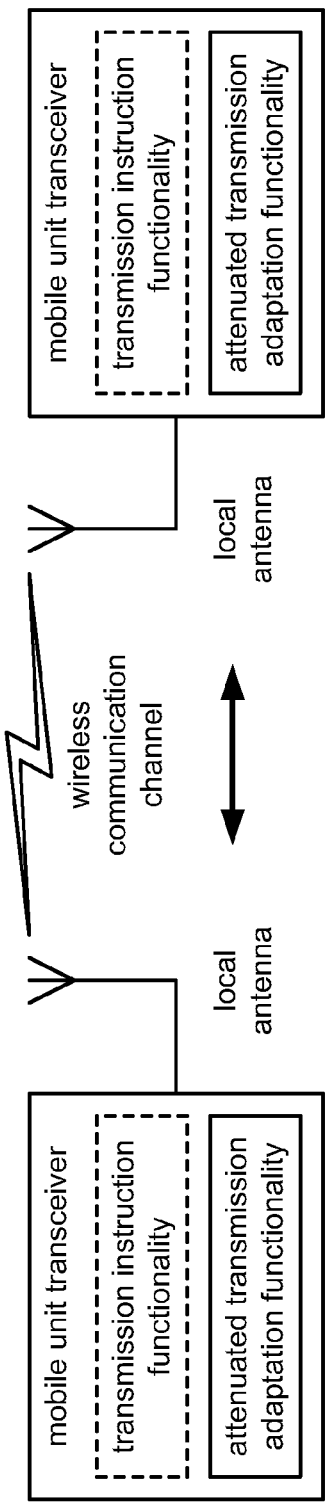
FIG. 7B is a system diagram illustrating embodiment of a bi-directional point-to-point radio communication system that is built according to the invention.

FIG. 7B is a system diagram illustrating embodiment of a bi-directional point-to-point radio communication system that is built according to the invention. Within the FIG. 7B, a first mobile unit transceiver is communicatively coupled to a first local antenna. The first mobile unit transceiver, using the first local antenna (the first mobile unit transceiver's local antenna), transmits a signal to a second local antenna of a second mobile unit transceiver via a wireless communication channel. The second mobile unit transceiver is communicatively coupled to the second local antenna (the second mobile unit transceiver's local antenna). The second local antenna is able to receive transmissions from the first local antenna that have been communicated via the wireless communication channel. The reverse communication operation may also be performed using the first and second mobile unit transceivers.

Each of the mobile unit transceivers is operable to support attenuated transmission adaptation functionality according to the invention. In addition, each of the mobile unit transceivers is operable, in certain embodiments, to support transmission instruction functionality such that one of the mobile unit transceivers is capable to instruct the other mobile unit transceiver regarding how that microwave transceiver is to change its transmission operating parameters to the other microwave transceiver.

The FIG. 7A and the FIG. 7B show yet more embodiments where attenuated transmission adaptation functionality is supported at the transmitter capable end (or ends) of a communication system and transmission instruction functionality may sometimes be supported at the receiver capable end (or ends) of the communication channel.

FIG. 8A is a system diagram illustrating an embodiment of a uni-directional communication system that is built according to the invention. A transmitter communicates to a receiver via a uni-directional communication channel. The uni-directional communication channel may be a wireline (or wired) communication channel or a wireless communication channel without departing from the scope and spirit of the invention. The wired media by which the uni-directional communication channel may be implemented are varied, including coaxial cable, fiber-optic cabling, and copper cabling, among other types of "wiring." Similarly, the wireless manners in which the uni-directional communication channel may be implemented are varied, including satellite communication, cellular communication, microwave communication, and radio communication, among other types of wireless communication.

The transmitter is operable to support attenuated transmission adaptation functionality according to the invention. In addition, the receiver is operable, in certain embodiments, such that the receiver is capable to instruct the transmitter regarding how the transmitter is to change its transmission operating parameters.

FIG. 8B is a system diagram illustrating an embodiment of a bi-directional communication system that is built according to the invention. Within the FIG. 8B, a first transceiver is communicatively coupled to a second transceiver via a bi-directional communication channel. The bi-directional communication channel may be a wireline (or wired) communication channel or a wireless communication channel without departing from the scope and spirit of the invention. The wired media by which the bi-directional communication channel may be implemented are varied, including coaxial cable, fiber-optic cabling, and copper cabling, among other types of "wiring." Similarly, the wireless manners in which the bi-directional communication channel may be implemented are varied, including satellite communication, cellular communication, microwave communication, and radio communication, among other types of wireless communication.

Each of the transceivers is operable to support attenuated transmission adaptation functionality according to the invention. In addition, each of the transceivers is operable, in certain embodiments, to support transmission instruction functionality such that one of the transceivers is capable to instruct the other transceiver regarding how that transceiver is to change its transmission operating parameters to the other transceiver.

FIG. 8C is a system diagram illustrating an embodiment of a one to many communication system that is built according to the invention. A transmitter is able to communicate, via broadcast in certain embodiments, with a number of receivers, shown as receivers 1, 2, . . . , n via a uni-directional communication channel. The uni-directional communication channel may be a wireline (or wired) communication channel or a wireless communication channel without departing from the scope and spirit of the invention. The wired media by which the bi-directional communication channel may be implemented are varied, including coaxial cable, fiber-optic cabling, and copper cabling, among other types of "wiring." Similarly, the wireless manners in which the bi-directional communication channel may be implemented are varied, including satellite communication, cellular communication, microwave communication, and radio communication, among other types of wireless communication.

A distribution point is employed within the one to many communication system to provide the appropriate communication to the receivers 1, 2, . . . , and n. In certain embodiments, the receivers 1, 2, . . . , and n each receive the same communication and individually discern which portion of the total communication is intended for themselves.

The transmitter is operable to support attenuated transmission adaptation functionality according to the invention. In addition, each of the receivers is operable, in certain embodiments, to support transmission instruction functionality such any one or more of the receivers may be capable to instruct the transmitter regarding how that transmitter is to change its transmission operating parameters for future transmissions to the receivers 1, 2, . . . and n.

The FIG. 8A, the FIG. 8B, and the FIG. 8C show yet more embodiments where attenuated transmission adaptation functionality is supported at the transmitter capable end (or ends) of a communication system and transmission instruction functionality may sometimes be supported at the receiver capable end (or ends) of the communication channel.

Figure 9:
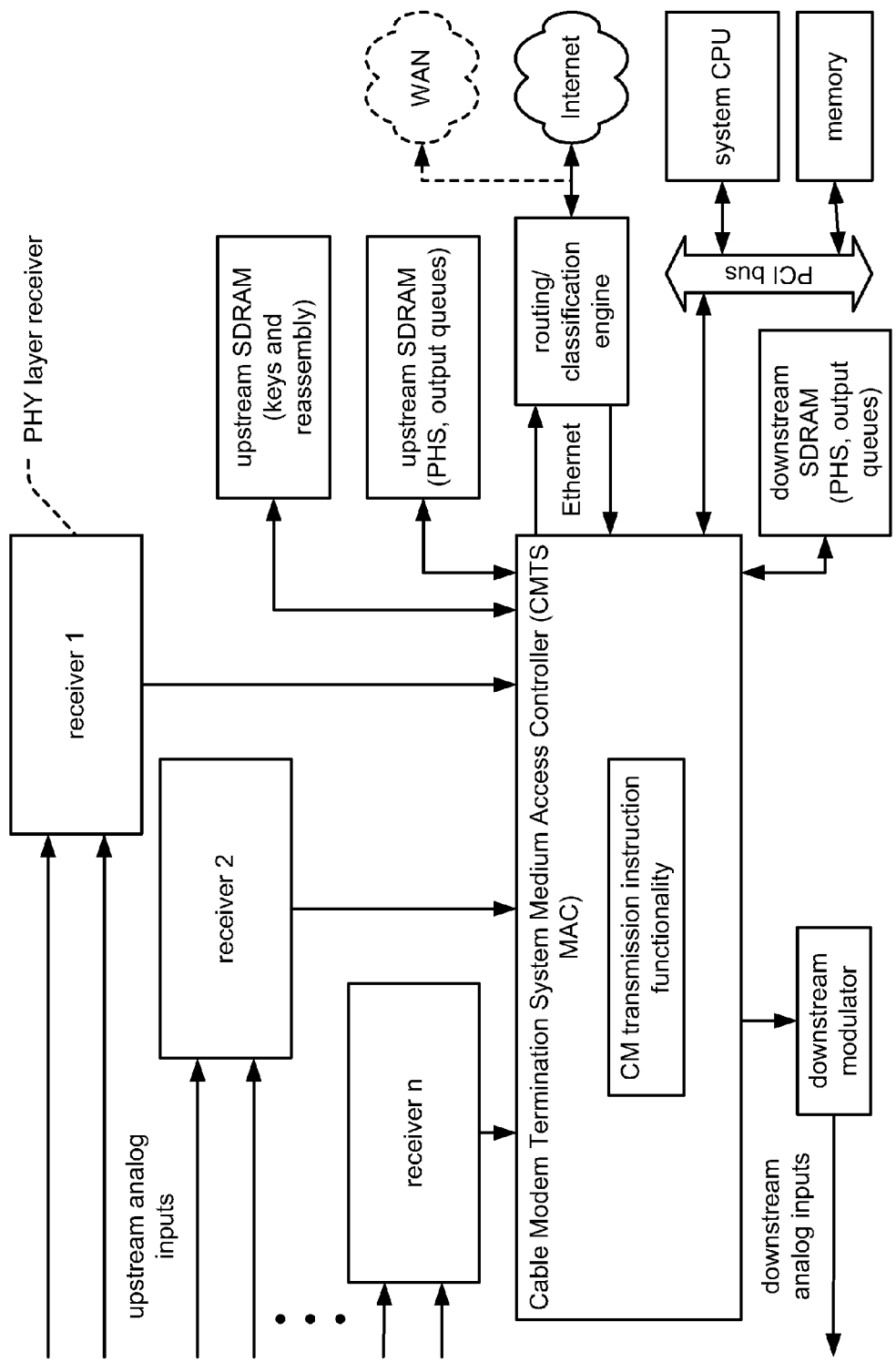
FIG. 9 is a system diagram illustrating an embodiment of a Cable Modem Termination System (CMTS) system that is built according to the invention.

FIG. 9 is a system diagram illustrating an embodiment of a Cable Modem Termination System (CMTS) system that is built according to the invention. The CMTS system includes a CMTS Medium Access Controller (MAC) that operates with a number of other devices to perform communication from one or more CMs to a WAN. The CMTS MAC is operable to support transmission instruction functionality such that is may direct any one or more Cable Modems (CMs) that are located downstream from the CMTS system.

The CMTS MAC may be viewed as providing the hardware support for MAC-layer per-packet functions including fragmentation, concatenation, and payload header suppression that all are able to offload the processing required by a system central processing unit (CPU). This will provide for higher overall system performance. In addition, the CMTS MAC is able to provide support for carrier class redundancy via timestamp synchronization across a number of receivers, shown as a receiver 1, receiver 2, . . . , and a receiver n. Each receiver is operable to receive upstream analog inputs. In certain embodiments, each of the receivers 1, 2, . . . , and n is a dual universal advanced TDMA/CDMA (Time Division Multiple Access/Code Division Multiple Access) PHY-layer burst receiver. That is to say, each of the receivers 1, 2, . . . , and n includes at least one TDMA receive channel and at least one CDMA receive channel; in this case, each of the receivers 1, 2, . . . , and n may be viewed as being multi-channel receivers. In other embodiments, the receivers 1, 2, . . . , and n includes only CDMA receive channels.

In addition, the CMTS MAC may be operated remotely with a routing/classification engine that is located externally to the CMTS MAC for distributed CMTS applications including mini fiber node applications. Moreover, a Standard Programming Interface (SPI) master port may be employed to control the interface to the receivers 1, 2, . . . , and n as well as to a downstream modulator.

The CMTS MAC may be viewed as being a highly integrated CMTS MAC integrated circuit (IC) for use within the various DOCSIS and advanced TDMA/CDMA physical layer (PHY-layer) CMTS products. The CMTS MAC employs sophisticated hardware engines for upstream and downstream paths. The upstream processor design is segmented and uses two banks of Synchronous Dynamic Random Access Memory (SDRAM) to minimize latency on internal buses. The two banks of SDRAM used by the upstream processor are shown as upstream SDRAM (operable to support keys and reassembly) and SDRAM (operable to support Packaging, Handling, and Storage (PHS) and output queues). The upstream processor performs Data Encryption Standard (DES) decryption, fragment reassembly, de-concatenation, payload packet expansion, packet acceleration, upstream Management Information Base (MIB) statistic gathering, and priority queuing for the resultant packets. Each output queue can be independently configured to output packets to either a Personal Computer Interface (PCI) or a Gigabit Media Independent Interface (GMII). DOCSIS MAC management messages and bandwidth requests are extracted and queued separately from data packets so that they are readily available to the system controller.

The downstream processor accepts packets from priority queues and performs payload header suppression, DOCSIS header creation, DES encryption, Cyclic Redundancy Check (CRC) and Header Check Sequence (of the DOCSIS specification), Moving Pictures Experts Group (MPEG) encapsulation and multiplexing, and timestamp generation on the in-band data. The CMTS MAC includes an out-of-band generator and CDMA PHY-layer (and/or TDMA PHY-layer) interface so that it may communicate with a CM device's out-of-band receiver for control of power management functions. The downstream processor will also use SDRAM (operable to support PHS and output queues). The CMTS MAC may be configured and managed externally via a PCI interface and a PCI bus.

The FIG. 9 shows yet another embodiment where transmission instruction functionality may sometimes be supported at the receiver capable end of the communication channel, specifically at the CMTS end of a cable modem communication system.

FIG. 10A is a diagram illustrating logical channel partitioning of a portion of spectrum that is performed according to the invention. The attenuated transmission adaptation functionality and methods described herein may also be implemented using logical channel partitioning of a number of available dimensions of a communication channel. The available dimensions may be time, as in a communication system employing Time Division Multiple Access (TDMA), or alternatively, codes, as in a communication system employing Code Division Multiple Access (CDMA), or a combination thereof.

For example, a communication channel (e.g., a radio frequency spectrum band, or portion thereof) may be partitioned into a number of logical channels. A given logical channel is active for a certain number of frames (e.g., for a predetermined time duration), then another logical channel is active, and so on, one at a time. This is typically referred to as TDMA with respect to the means of sharing the spectrum among logical channels.

However, the concept of logical channel partitioning may be extended such logical channels may be implemented as multi-dimensional logical channels. For example, a logical channel may be implemented to exist in 2 dimensions, such as time and code. This is a 2 dimensional logical channel. In this 2 dimensional approach, the given 2 dimensional logical channel would be active during a given set of contiguous frames (or portions of information), and in a certain set of codes. This would permit several logical channels to be active simultaneously, while being separated in code space. Similarly, the multi-dimensional logical channel concept may be extended to cover higher orders of dimensionality. For example, a logical channel may be implemented to exist in 3 dimensions, such as time, code, and frequency. Clearly, this dimensionality may be extended to an n-dimensional logical channel without departing from the scope and spirit of the invention.

While the FIG. 10A shows a communication system employing uni-directional communication between a transmitting device and a receiving device, the invention envisions performing logical channel partitioning within both directions of a bi-directional communication system as well.

FIG. 10B is a diagram illustrating an embodiment of logical channel partitioning of Synchronous Code Division Multiple Access (S-CDMA) codes in a Data Over Cable Service Interface Specification (DOCSIS) system that is performed according to the invention. The FIG. 10B shows how the logical channel partitioning may be employed based on the 128 codes that are currently available according to DOCSIS. For example, a logical channel 1 may be comprised of codes 1 through 64 of DOCSIS, and a logical channel 2 may be comprised of codes 65 through 128 of DOCSIS. A third logical channel, logical channel 3, may be comprised of all 128 codes or of logical channels 1 and 2.

The selection of which 64 DOCSIS codes will be used to comprise the logical channel 1 and which 64 DOCSIS codes will be used to comprise the logical channel 2 may be performed using a CMTS MAC.

In some embodiments, when a CM isn't in a highly attenuated path (that is, upstream path to the CMTS), then that CM would be able to receive grants on either the full 128 code logical channel (logical channel 3) or either of the 64 code logical channels (logical channels 1 or 2). The 128 code logical channel (logical channel 3) is again equivalent to the combined two logical channels of 64 codes (logical channels 1 or 2).

It is also noted that the grouping of codes into logical channels need not be performed such that the codes are adjacent to one another. For example, either of the 64 code logical channels (logical channels 1 or 2) may select the 64 channels from among all of the 128 available codes; for example, logical channel 1 may include codes, 1, 3, 4, 6, 10, and so on, including a total number of codes being 64.

Figure 11:
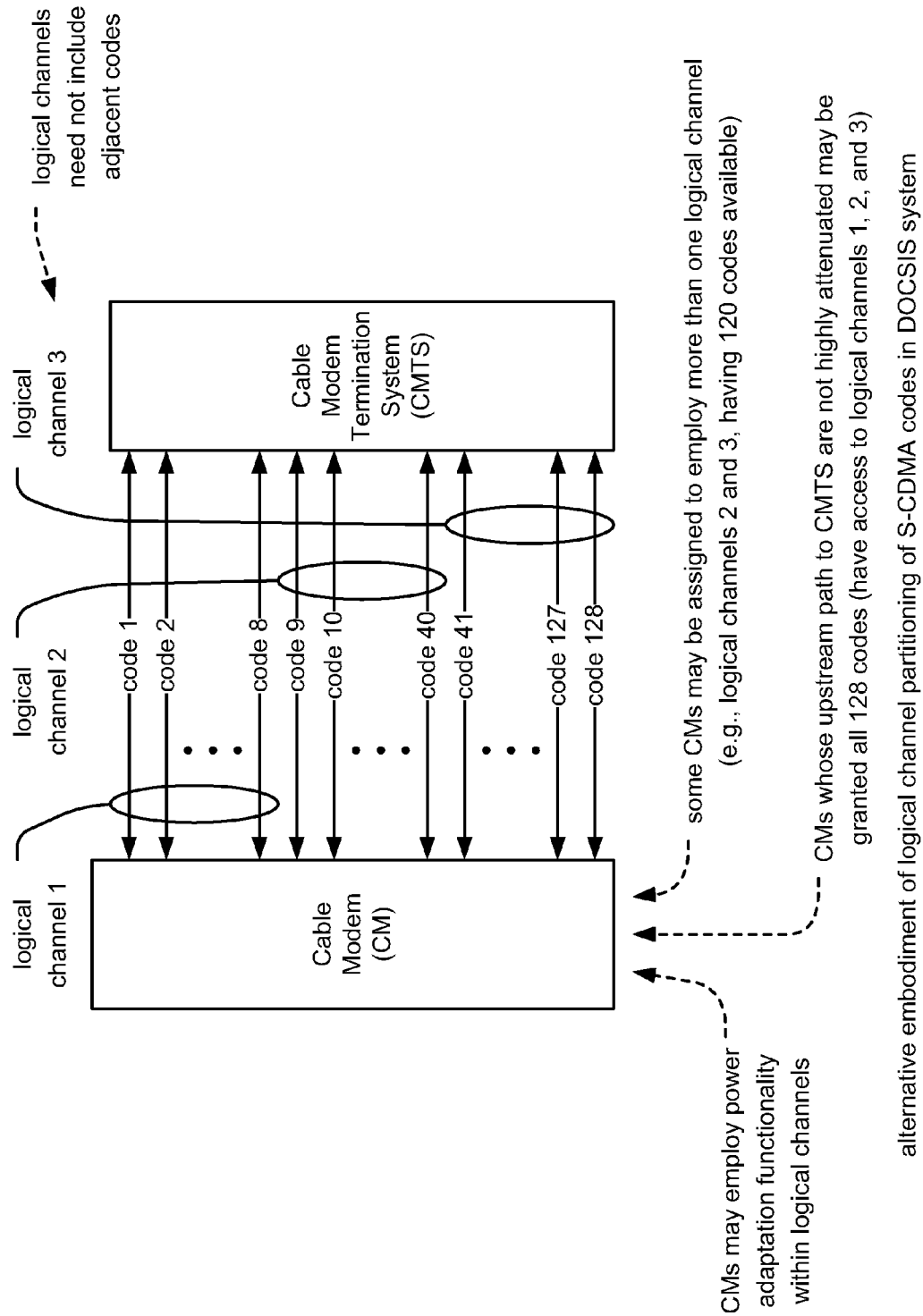
FIG. 11 is a diagram illustrating an alternative embodiment of logical channel partitioning of S-CDMA codes in a DOCSIS system that is performed according to the invention.

FIG. 11 is a diagram illustrating an alternative embodiment of logical channel partitioning of S-CDMA codes in a DOCSIS system that is performed according to the invention. Again, the FIG. 11 shows an embodiment of how channel partitioning may be performed using the 128 codes of a DOCSIS communication system. If a CM is in an attenuated channel situation (between the CM and the CMTS) where it must only transmit on, for example, Npc=8 codes, then the available channel may be divide into a set of logical channels such that at least one (or a combination thereof) of the logical channels will permit transmission using 8 codes.

As an example, the 128 DOCSIS codes may be partitioned into logical channels as follows: logical channel 1 with Nc1=8 codes, logical channel 2 with Nc2=32 codes, and logical channel 3 with Nc3=88 codes. It is noted that Nc1+Nc2+Nc3=Nac=128 codes, so that all of the active codes (Nac) may be accounted by all of the logical channels.

In certain embodiments, a given CM may be assigned to one of these logical channels (e.g., logical channel 1), and transmit the reduced number of codes (e.g., 8 codes). Accordingly, with increased power per code (e.g., 8 times more power per code) may also be employed to overcome the attenuated channel. This power adaptation functionality is described in more detail below.

As an extension of the concept, a CM may be assigned to more than one of the logical channels that comprise codes. For example, a CM may be assigned to logical channels 2 and 3. In this case it would be assigned Nc2+Nc3=120 codes. This provides even more flexibility in assigning numbers of codes per CM. In addition, for a CM whose upstream path to the CMTS does not experience much attenuation, then a $4^{th}$ logical channel that includes all of these 3 logical channels may be used thereby making all 128 codes available to that CM.

It is noted that the invention is adaptable to communication systems that employ modulation techniques having orthogonal waveforms. The invention may also be extended to other communication systems that other communication systems that employ a signal space having orthogonal signals contained therein.

For example, in addition to orthogonal waveforms and signaling schemes such as code division multiple access (CDMA) signaling dimensions, synchronous code division multiple access (S-CDMA) signaling dimensions, time division multiple access (TDMA) signaling dimensions, etc., there are also other orthogonal waveforms and signaling schemes such as orthogonal frequency division multiplexing (OFDM) signaling dimensions, discrete multi-tone (DMT) signaling dimensions, etc., such as described in U.S. utility patent application Ser. No. 10/142,189, now U.S. Pat. No. 7,110,434, which is incorporated herein by reference above, that may also be adapted to employ various of the principles described herein.

One particular example of a communication system employing orthogonal waveforms includes a communication system employing Synchronous Code Division Multiple Access (S-CDMA) codes. The orthogonal waveforms have the property that multiple waveforms (e.g., codes in DOCSIS 2.0 S-CDMA) can be transmitted simultaneously by a given transmitting device. The total number of codes that may be is use anywhere on a communication channel are referred herein as the number of active codes (the number of codes in use anywhere on the channel) and they are denoted Nac.

As also mentioned above with respect to FIG. 10, it is also noted that the grouping of codes into logical channels need not be performed such that the codes are adjacent to one another.

Figure 12:
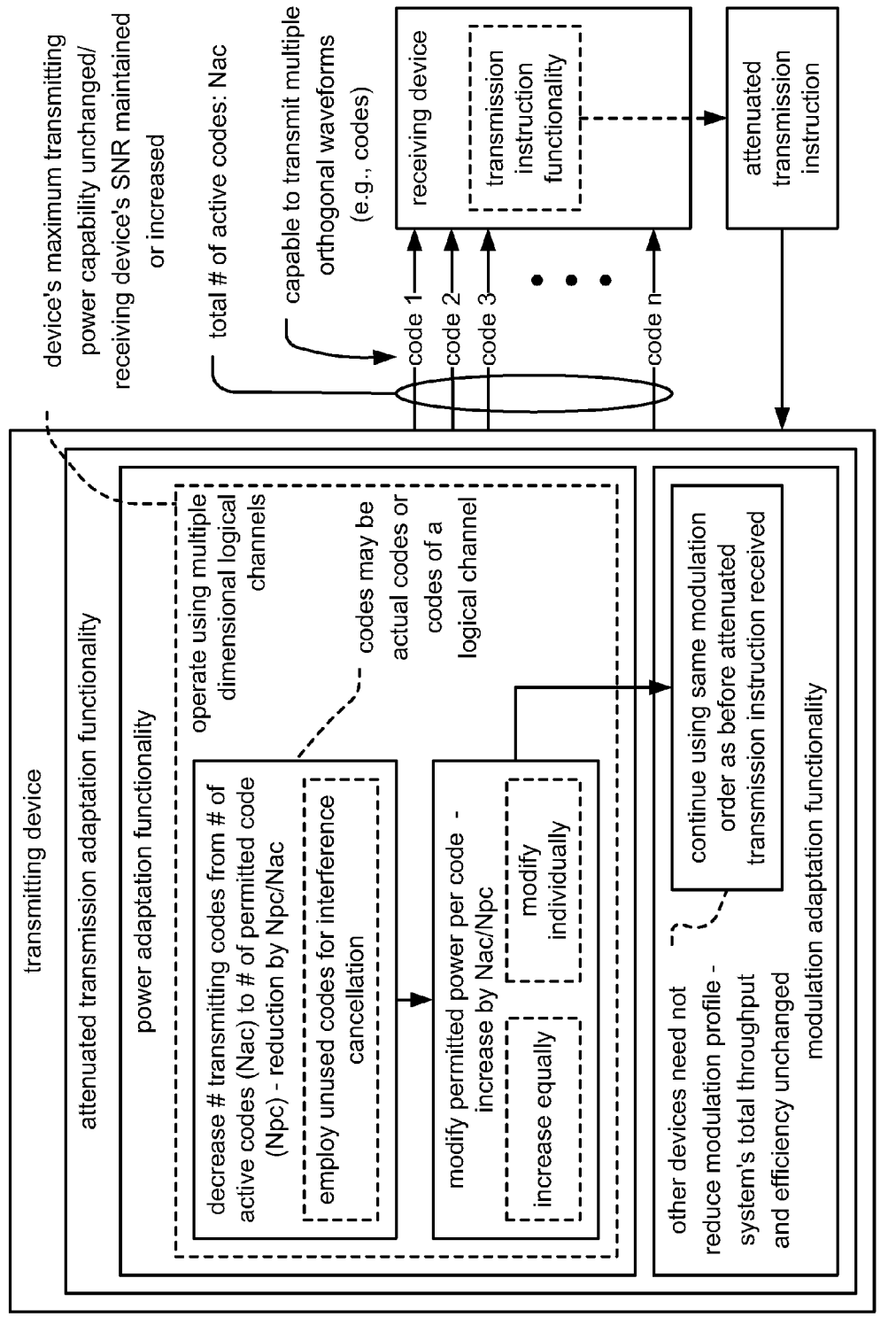
FIG. 12 is a functional block diagram illustrating an embodiment of power and modulation adaptation functionality that is arranged according to the invention

FIG. 12 is a functional block diagram illustrating an embodiment of power and modulation adaptation functionality that is arranged according to the invention. This figure shows the power and modulation adaptation functionality being supported within a communication system having a transmitting device and a receiving device. However, the functionality described herein may also be implemented within transceiver type devices that also support both receive and transmit functionality.

The transmitting device is implemented to support attenuated transmission adaptation functionality. The receiving device may be implemented to support transmission instruction functionality. The receiving device may be the source of instructions provides to the transmitting device, the transmitting device may initiate operations according to the attenuated transmission adaptation functionality contained therein, or a combination thereof may be implemented.

As shown within the power adaptation functional block, a given transmitting device is instructed to reduce the number of codes it can transmit to Npc, or number of permitted codes. Again, the total number of available codes that can be used anywhere on the system is denoted as Nac (total number of active codes). In general Npc<Nac. This reduction in codes to the number of permitted codes, Npc, reduces the available burst throughput of that individual transmitting device by the factor Npc/Nac. Other transmitting devices on the network are permitted to transmit on the remaining codes; this has the benefit that the overall throughput of the communication channel is not affected by the limitation on this individual transmitting device.

The unused codes (those codes of Nac that are left over after the reduction has been made to Npc, the number of unused codes being Nac−Npc) may be used to perform interference cancellation according to the invention.

In addition, the transmitting device is also instructed to increase its permitted power per code by the factor Nac/Npc which is substantially the inverse of the factor by which the number of transmitting codes has been reduced. This may even give the transmitting device a higher Signal to Noise Ratio (SNR) at the receiving device by the same factor Nac/Npc. When the transmitting device is using all Npc of its codes, its transmitted power is the same as if it were if permitted to use Nac codes with the original amount of power per code. That is, the decrease in the number of codes transmitted, and the increase in power per code, will substantially cancel one another, and the maximum power transmit capability of the transmitting device will remain unchanged. This has the benefit that the power limitation of the transmitting device is not exceeded, even though the receive SNR is either maintained or increased.

As shown within modulation adaptation functional block, when the transmitting device is transmitting with this reduced number of permitted codes, the transmitting device may continue to use the same upstream burst profile as before. For example, if a high order modulation density, such as 64 QAM (Quadrature Amplitude Modulation) was used before the instruction to decrease the number of transmitting codes was received, then the same high order modulation density may also be used afterwards as well. This gives a significant benefit, in that, any other transmitting devices on the network are not required to reduce their upstream burst profiles. It gives even another benefit that the total throughput and throughput efficiency on the communication channel may remain unchanged.

Figure 13:
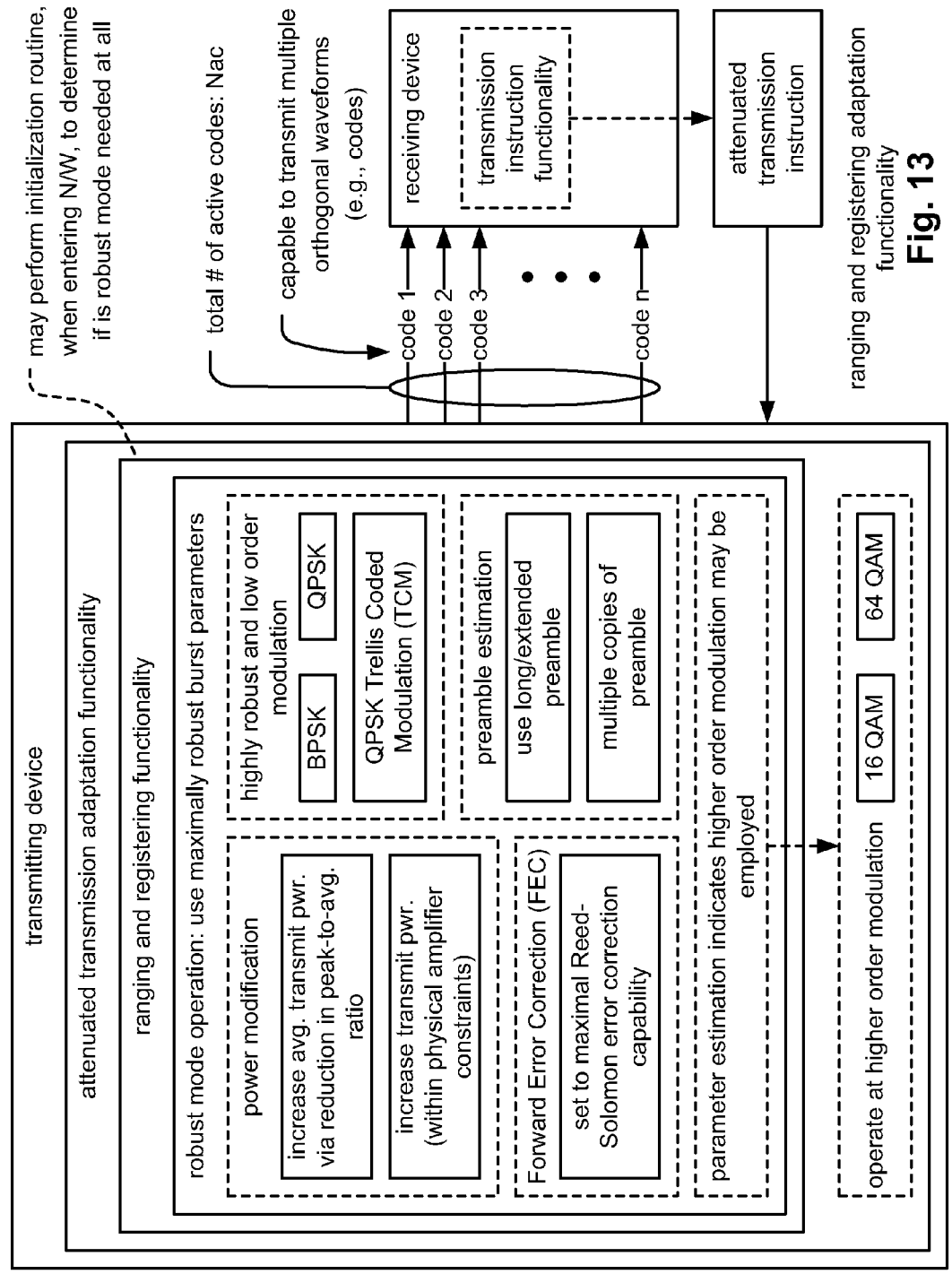
FIG. 13 is a functional block diagram illustrating an embodiment of ranging and registering functionality that is arranged according to the invention

FIG. 13 is a functional block diagram illustrating an embodiment of ranging and registering functionality that is arranged according to the invention. A transmitting device is operable to support robust mode operation to do ranging and registering using a group of maximally robust burst parameters and the ranging and registering may be performed across a robust logical channel. The maximally robust burst parameters may be achieved using a variety of means, and some possible means are described below.

A highly robust and low order modulation may be employed to support the robust mode operation. Some examples of highly robust and low order modulation may include BPSK (Binary Phase Shift Keying) modulation, QPSK (Quadrature Phase Shift Keying) and/or QPSK TCM (QPSK Trellis Coded Modulation).

In addition, the Forward Error Correction (FEC) of the communication system, that is typically performed in a receiving device, may also be controlled using parameters stored within the transmitting device. For example, the transmitting device may provide information to the receiving device that it is to use the maximal setting of any Reed-Solomon error correction capability contained therein.

Moreover, even other means may be performed by which the robust mode operation may be supported. For example, preamble estimation may be modified by the receiving device as governed by the transmitting device. The transmitting device is able to send ranging bursts to the receiving device. These ranging burst sent by the transmitting device are designed to permit accurate parameter estimation at the receiving device. For example, the transmitting device may send an extended preamble (sometimes referred to as a long preamble), or multiple copies of the preamble, and the receiving device may average its estimates over the multiple copies of the preamble. The extended preamble/long preamble being longer than a preamble typically employed within the communication system.

It is noted that a key element here, to support robust mode operation, is that the ranging may take place using a lower order modulation such as QPSK, at a relatively low SNR such as 10 dB, but the parameter estimates are of high enough quality to support eventual transmission at a higher order modulation, such as 16 QAM or 64 QAM, at a higher SNR such as 25 dB. This higher SNR may be achieved, as described above, by increasing the power per code while using fewer codes. In addition, the robust mode operation may perform the parameter estimation, and that parameter estimation may then indicate that a higher order modulation may subsequently be employed. In so, then the transmitting device will operate at that higher order modulation, such as 16 QAM or 64 QAM, among other higher order modulation types.

Alternatively, power modification functionality may be employed to provide for the robust mode operation. The transmitting device may increase the transmit power where possible given physical amplifier constraints, or the transmitting device may increase the average transmit power via reduction in peak-to-average ratio, among other power modification that may be performed to support the robust mode operation.

A means is utilized to communicate to the transmitting device that it needs to enter this robust mode. Such a means may include a separate logical channel, and/or a proprietary communications channel via the downstream. In the context of a cable modem communication system, this communication may be achieved using the CM network segment itself.

It is also noted that when a transmitting device first attempts to enter the network, it may have to follow a logical decision process to determine if it should go into this robust mode. That is to say, the transmitting device may perform an initialization routine, when entering the network, to determine if robust mode operation is even needed at all.

Figure 14:
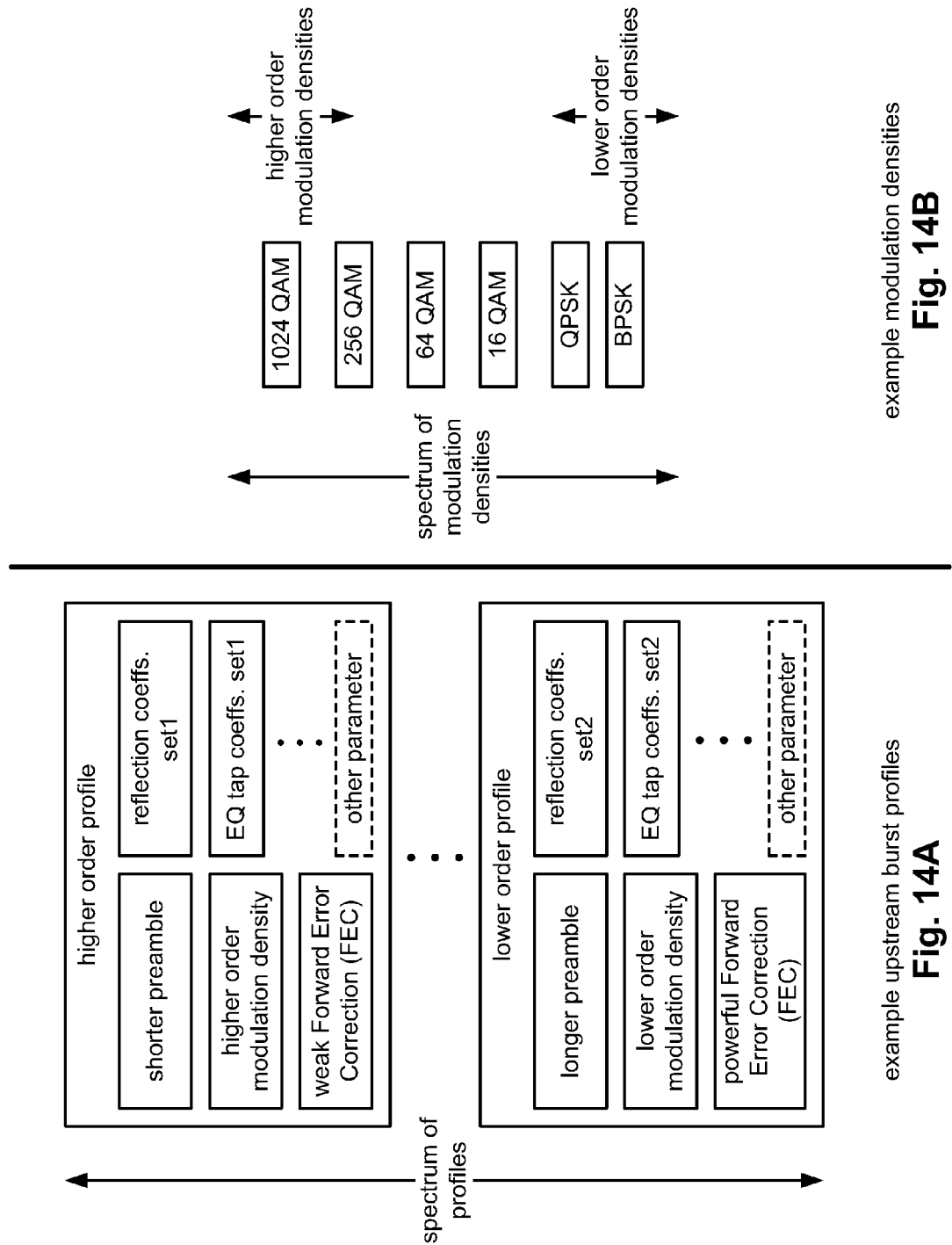
FIG. 14A is a diagram illustrating example upstream burst profiles that may be employed according to the invention.
FIG. 14B is a diagram illustrating example modulation densities that may be employed according to the invention.

FIG. 14A is a diagram illustrating example upstream burst profiles that may be employed according to the invention. A spectrum of upstream data burst profiles may be used. Generically speaking, a higher order profile and a lower order profile may be used. The higher order profile may be viewed as having a relatively shorter preamble, a relatively higher modulator density, relatively weak Forward Error Correction (FEC), an equalizer tap coefficient set1, a reflection coefficients set1, and other parameters as required or desired. The higher order profile may be viewed as being operable on a channel whose characteristics can support this higher order level of processing. A relatively accurate channel estimation and channel equalization may need to be performed to accommodate upstream data bursting using the higher order profile.

The lower order profile may be viewed as having a relatively longer preamble (when compared to the shorter preamble of the higher order profile), a relatively lower modulator density (when compared to the higher order modulator density of the higher order profile), relatively powerful FEC (when compared to the weaker FEC of the higher order profile), an equalizer tap coefficient set2, a reflection coefficients set2, and other parameters as required or desired; the parameters of the lower order profile are much more robust than the parameters of the higher order profile. The lower order profile may be viewed as being operable on a channel whose characteristics are unable to support the higher order level of processing within the higher order profile. A relatively accurate channel estimation and channel equalization may not be available or may be unable to be performed to accommodate upstream data bursting using the higher order profile, the invention then provides operation using the lower order profile.

This figure shows a spectrum of available upstream data burst profiles that may be used according to the invention to perform and continue upstream data bursting from the CMs to the CMTS. Operation at the lower order profile will provide sufficient protection to ensure that the upstream data burst will get through even when the channel may be corrupted. Each of the upstream data burst profiles includes a modulation density. The modulation density may be viewed as being one parameter within an upstream data burst profile. If desired, and as will be shown and described in various embodiments, various profiles may be employed when performing upstream data bursting according to the invention; or alternatively, only various modulation densities may be employed when performing upstream data bursting according to the invention. Clearly, other operational parameters may be used to differentiate and continue upstream data bursting when desiring to operate at a more (or less) robust operational state.

FIG. 14B is a diagram illustrating example modulation densities that may be employed according to the invention. The spectrum of modulation densities involves higher order modulation densities and lower order modulation densities. For example, the spectrum of modulation densities ranges from 1024 QAM (Quadrature Amplitude Modulation), 256 QAM, 64 QAM, 16 QAM, QPSK (Quadrature Phase Shift Keying), and BPSK (Binary Phase Shift Keying). Other modulation schemes could similarly be employed and arranged in an increasing/decreasing order of density without departing from the scope and spirit of the invention. The higher order modulation densities may be viewed as including the 1024 QAM and 256 QAM, and the lower order modulation densities may be viewed as including the 16 QAM, QPSK, and BPSK. In some embodiments, a higher order modulation density may be viewed as including only 16 QAM, and a lower order modulation density may be viewed as including only QPSK.

The higher order modulation densities may be used within those communication channels (which may be logical channel and/or multi-dimensional logical channels) that have been adequately ranged and registered to support that level of modulation density, and the low order modulation densities may be used within those channels that have not yet been adequately ranged and registered to support higher levels of modulation density. In addition, the low order modulation densities may be used to perform the actual ranging and registering of a CM onto a new channel (such as a logical channel and/or a multi-dimensional logical channel).

Figure 15:
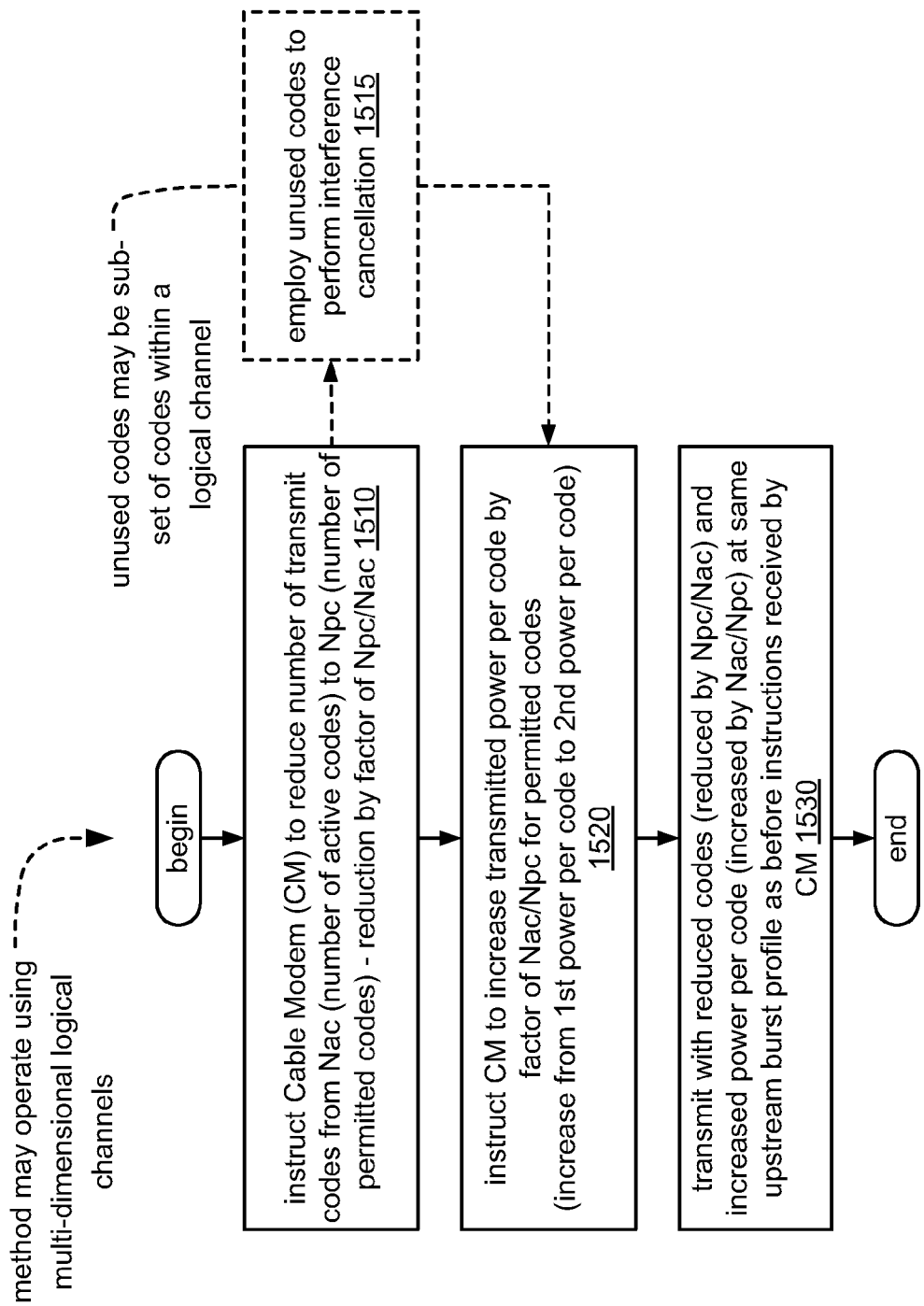
FIG. 15 is an operational flow diagram illustrating an embodiment of an attenuated transmission adaptation method, employing power and modulation adaptation, that is performed according to the invention.

FIG. 15 is an operational flow diagram illustrating an embodiment of an attenuated transmission adaptation method, employing power and modulation adaptation, that is performed according to the invention. It is noted that the method described herein may operate using an embodiment of the multi-dimensional logical channels described in more detail above.

As shown in a block 1510, a given CM is instructed to reduce the number of codes it can transmit to Npc, or number of permitted codes, from the total number of active codes Nac. In general Npc<Nac. This reduces the available burst throughput of that individual CM by the factor Npc/Nac. Any other CMs on the network will be permitted to transmit on the remaining codes; this has the benefit that the overall throughput of the channel is not affected by the limitation on this individual CM.

If desired in certain embodiments, these now unused codes, codes of Nac that are not included in Npc, may be employed to perform interference cancellation as shown in a block 1515. In an alternative embodiment, these unused codes may a subset of codes within a logical channel; the logical channel may also be implemented as a multi-dimensional logical channel without departing from the scope and spirit of the invention.

Continuing on with the method, as shown in a block 1520, the CM is also instructed to increase its permitted power per code by the factor Nac/Npc for the remaining permitted codes, Npc. This may be viewed as increasing the power per code form a $1^{st}$ power per code to a $2^{nd}$ power per code. This gives the CM a higher SNR at the CMTS by the same factor Nac/Npc. When the CM is using all Npc of its codes, the total transmitted power of the CM may be maintained the same as if it were if permitted to use Nac codes with the original amount of power per code. That is, the decrease in the number of codes transmitted, and the increase in power per code, will substantially cancel one another, and the maximum power transmitted by the CM is unchanged. This has the benefit that the power limitation of the CM is not exceeded, even though the receive SNR is increased.

Moreover, as shown in a block 1530, when transmitting with this reduced number of permitted codes, Npc, the CM continues to use the same upstream burst profile as before. For example, even is a higher order modulation density is employed beforehand, such as 64 QAM, then the same higher order modulation density may be employed after reducing the number to transmitting codes from Nac to Npc. This gives a benefit that any other CMs on the cable modem network are not required to reduce their upstream burst profiles. It gives yet another benefit, in that, the total throughput and throughput efficiency on the communication channel may remain unchanged.

Figure 16:
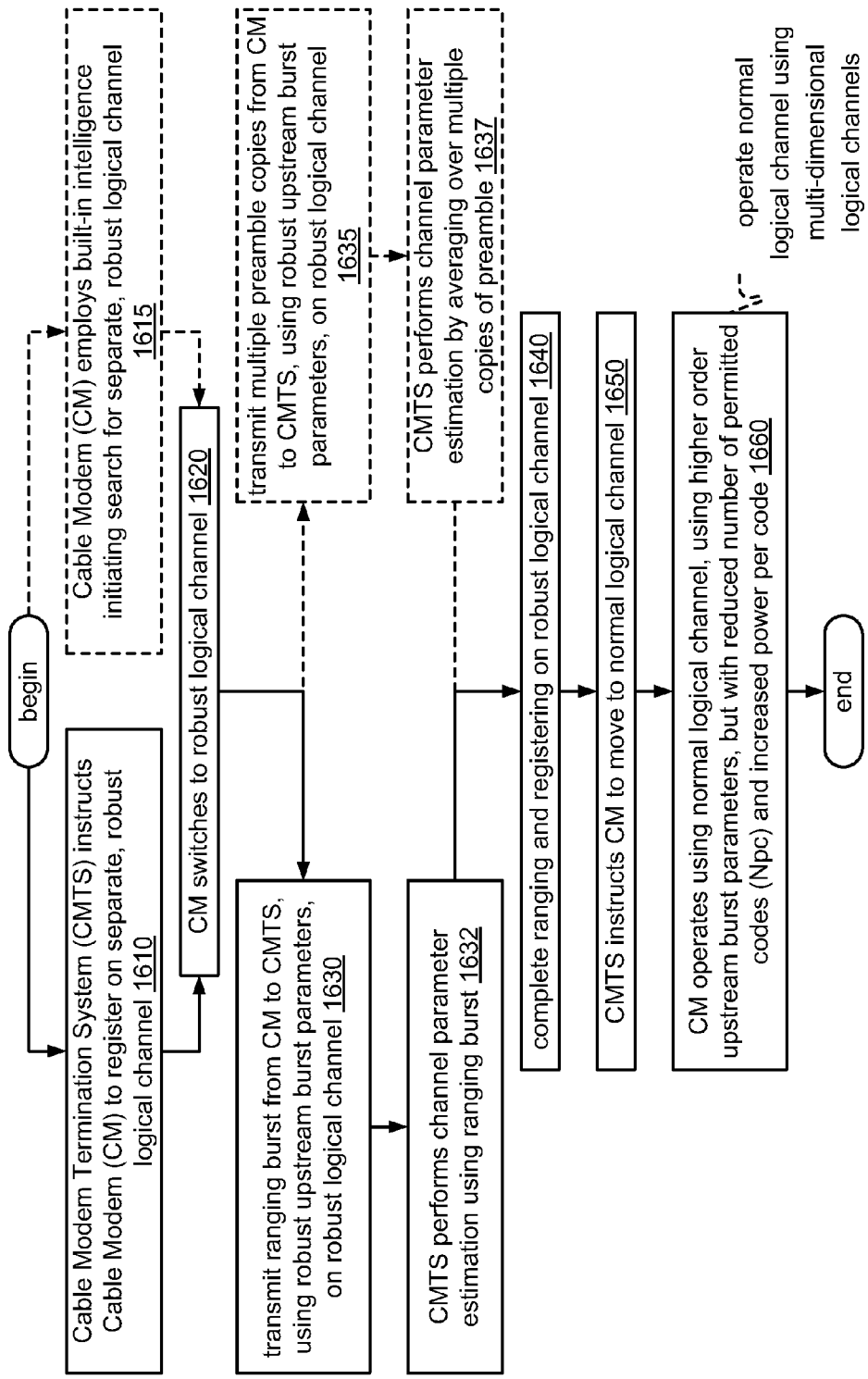
FIG. 16 is an operational flow diagram illustrating an embodiment of an attenuated transmission adaptation method, employing ranging and registering adaptation, that is performed according to the invention.

FIG. 16 is an operational flow diagram illustrating an embodiment of an attenuated transmission adaptation method, employing ranging and registering adaptation, that is performed according to the invention.

A CM is given the means to range and register using the maximally robust burst parameters. Such a robust parameter set may include BPSK modulation, or QPSK trellis coded modulation; maximal setting of Reed-Solomon error correction capability; long preamble/extended preamble; increased transmit power where possible given physical amplifier constraints; increased average transmit power via reduction in peak-to-average ratio; etc.

As shown in a block 1610, a Cable Modem Termination System (CMTS) instructs a CM that it is to register on a separate, robust logical channel. In this embodiment, a means may be utilized to communicate from the CMTS to the CM that it needs to enter this robust mode operation. Such a means may include a separate logical channel, a proprietary communications channel via the downstream, and/or some other communication means. When a CM first attempts to enter the cable modem network, the CM may have to follow a logical decision process to determine if it should go into this robust mode operation. Alternatively, as shown in a block 1615, the CM itself employs built-in intelligence that is used to initiate a search for a separate, robust logical channel. In yet another embodiment, a combination thereof may be employed where the CM and the CMTS operate cooperatively to search for the separate, robust logical channel.

In whichever embodiment of the blocks 1610 or 1615 is employed, the method continues, as shown in a block 1620, such that the CM switches to the separate, robust logical channel.

As shown in a block 1630, ranging bursts sent by the CM are designed to permit accurate parameter estimation at the CMTS. The CMTS then performs parameter estimation of the communication channel using the ranging burst as shown in a block 1632. In addition, the CM may send an extended preamble, or multiple copies of the preamble, and the CMTS may average its estimates over the multiple copies of the preamble. Specifically, as shown in a block 1635, multiple copies of a preamble are transmitted from the CM to the CMTS. Then, as shown in a block 1637, the CMTS performs parameter estimation of the communication channel by averaging over the multiple copies of the preamble that have been transmitted form the CM to the CMTS.

As shown in a block 1640, the ranging and registering of the CM is completed on the separate, robust logical channel. After the ranging and registering of the CM is completed, then the CMTS instructs the CM to move to a normal logical channel as shown in a block 1650. This normal logical channel may include a higher order upstream burst profile. Then, as shown in a block 1660, the CM operates on the normal logical channel, using higher order upstream burst parameters, but with reduced number of permitted codes (Npc) and increased power per code (as described above in greater detail).

Again, it is noted that the ranging may take place using a lower order modulation such as QPSK, at low SNR such as 10 dB, but the parameter estimates are of high enough quality to support eventual transmission at a higher order modulation such as 64 QAM at a higher SNR such as 25 dB. This higher SNR is achieved, as described above, by increasing the power per code while using fewer codes (again, as described above in greater detail).

While the methods shown within the FIGS. 15 and 16 are described in the context of a communication system having at least one CM and a CMTS, it is understood that the invention envisions that these methods may be performed within any communication system having a transmitting device (shown in these examples as the CM) and a receiving device (shown in these examples as the CMTS).

A specific example is provided to illustrate some of the more general concepts of the invention. This example operates on the framework of a DOCSIS 2.0 S-CDMA system, where Nac=128 active codes. For 64 QAM, a SNR of 25 dB SNR is required at the receiver (e.g., the CMTS). A given CM can output up to 53 dBmV power in S-CDMA mode when transmitting to the CMTS, and up to 58 dBmV in TDMA mode when transmitting to the CMTS.

In this example, the assumption is made that most CMs are communicating with the required 25 dB SNR using 64 QAM. However, a given CM, referred to as CM 1, may have a greater attenuation due to a poorly planned cable layout in the apartment complex. When transmitting at its maximum power of 53 dBmV with all 128 codes, CM 1 would only produce 15 dB SNR (instead of the desired 25 dB) at the receiver (e.g., the CMTS). Hence it has a disadvantage of 10 dB that must be overcome.

The CM 1 will then attempt to enter the cable modem network, and the CM 1 will find that it cannot communicate easily. It determines this fact by failed ranging attempts. The cable headend (e.g., the CMTS) will then instruct CM 1 to register on a separate robust logical channel, or the CM 1 itself has built-in intelligence that causes it to search for a robust logical channel. CM 1 then switches to the robust logical channel, where the upstream ranging is more robust, perhaps due to the fact that preamble lengths are longer, e.g., QPSK TCM is used, 58 dBmV or slightly more is transmitted on QPSK ranging bursts, maximum Reed-Solomon (RS) Forward Error Correction (FEC) parameters are used, etc.

CM 1 then succeeds in ranging and registering on the separate, robust logical channel. The cable headend (e.g., the CMTS) then instructs CM 1 to move to the normal logical channel and begin communicating in 64 QAM, but with a reduced number of permitted codes: Npc=128/16=8 codes. This causes the power per code to increase by a factor of 16. This gives CM 1 an advantage of 10 log 16=12 dB, which more than overcomes the disadvantage of 10 dB. Now CM 1 finds that its SNR at the receiver is 25-27 dB, which is more than enough to communicate using a modulation density of 64 QAM. The burst throughput of CM 1 is of course limited by a factor of 16, but the overall throughput and throughput efficiency of the channel is unchanged.

FIG. 17A, FIG. 17B, FIG. 18A, and FIG. 18B are operational flow diagrams illustrating embodiments of attenuated transmission adaptation methods that are performed according to the invention. These various attenuated transmission adaptation methods may be viewed as enabling upstream transmission from CMs operating in an S-CDMA mode (or using a similar orthogonal spreading technique such as spread S-TDMA (Synchronous Time Division Multiple Access) =spread single carrier modulation) with limited transmit power in the presence of very large channel attenuation. A variety of different cases are presented to show some of the many different ways in which the invention may be implemented.

Referring to the FIG. 17A, this embodiment operates by reducing the number of simultaneously employed codes (=dimensions). One specific embodiment involves reducing the number of codes to be used from 2N codes to N codes; clearly, other degrees of reduction of used codes may also be performed without departing from the scope and spirit of the invention. In this embodiment, the available total transmit power P is then shared among fewer codes and hence allows for the use of the transmit power P to be larger on a per-code basis. That is to say, each of the used codes then employs a larger portion of the total transmit power P.

Referring to the FIG. 17B, this embodiment operates by maintaining the same number of employed codes (or the same number of dimensions) as is initially employed; this involves no reduction in the number of used codes. For example, all 2N of the codes may be employed in one specific embodiment. Then, the method involves modulating pairs of codes with the same modulation symbol. This may be viewed as performing repetition coding which may also be viewed as a reduction of the modulated signal dimensions. In the receiver, the output signals of the corresponding despreaders are coherently added together. The SNR (Signal to Noise Ratio) of this attenuated transmission adaptation method may be implemented to provide for precisely the same SNR as that provided by the attenuated transmission adaptation method described with respect to the FIG. 17A.

Figure 18B:
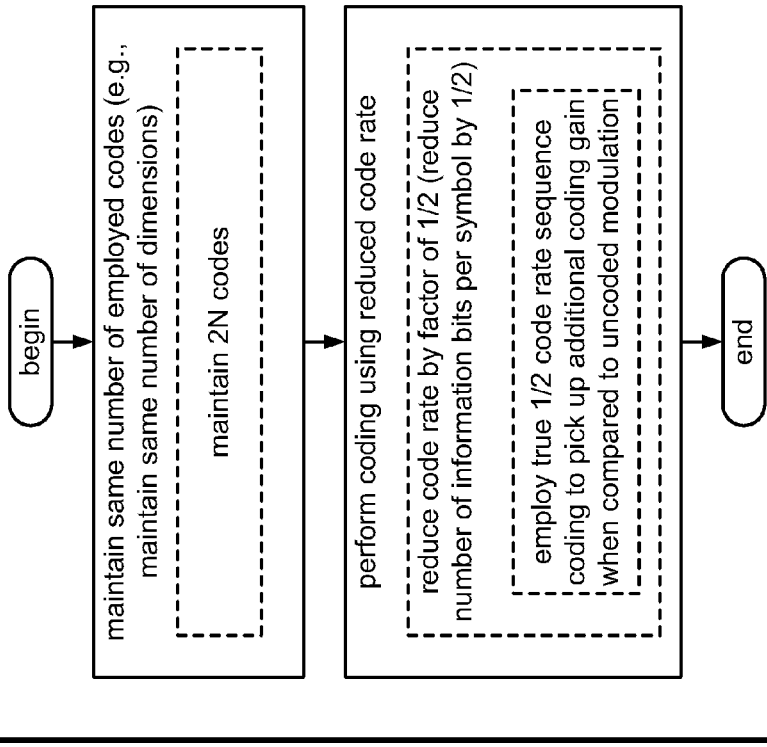
Figure 18A:
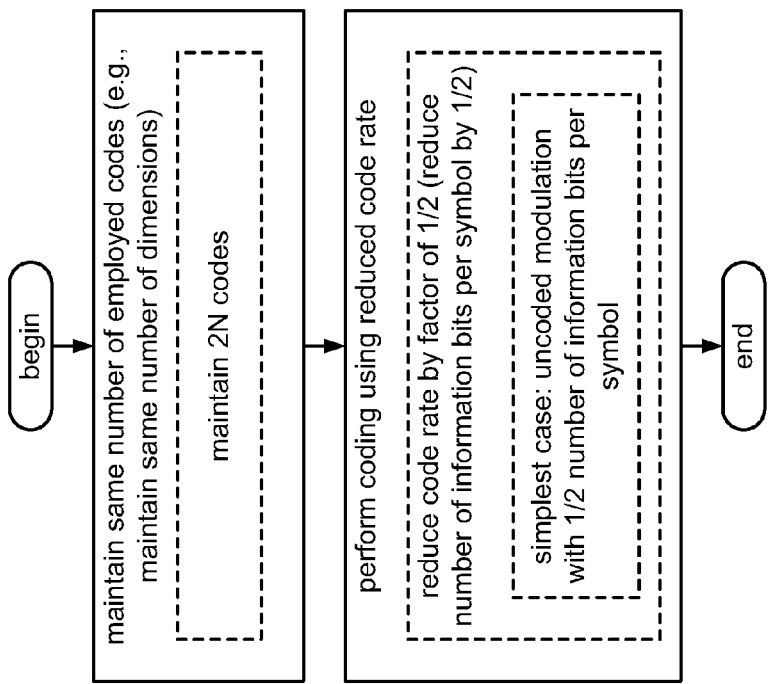

Referring to the FIG. 18A, this embodiment also operates by maintaining the same number of employed codes (or the same number of dimensions) as is initially employed; this involves no reduction in the number of used codes. For example, all 2N of the codes may be employed in one specific embodiment.

However, in this embodiment, the coding is performed using a reduced code rate. In one particular embodiment, this code rate reduction involves using 2N codes and employing a code rate that is ½ when compared to the code rate to the attenuated transmission adaptation methods described with respect to the FIG. 17A and the FIG. 17B. In a simplest case implementation, this embodiment takes the form of uncoded modulation with ½ the number of information bits per symbol. The performance of this attenuated transmission adaptation method embodiment will generally be better than the attenuated transmission adaptation method described with respect to the FIG. 17B.

Referring to the FIG. 18B, this embodiment also operates by maintaining the same number of employed codes (or the same number of dimensions) as is initially employed; this involves no reduction in the number of used codes. For example, all 2N of the codes may be employed in one specific embodiment.

Again, the coding is performed using a reduced code rate. In one particular embodiment, this code rate reduction involves using 2N codes and employing a code rate that is ½ when compared to the code rate to the attenuated transmission adaptation methods described with respect to the FIG. 17A and the FIG. 17B. However, in this particular embodiment, which may be provide for the best performance according to the invention, is employed to employ all of the 2N codes and also to employ a true code rate R=½ (rate compared to that of the attenuated transmission adaptation methods described with respect to the FIG. 17A and the FIG. 17B) sequence coding to pick up any additional coding gain over the attenuated transmission adaptation method described with respect to the FIG. 18A. For example, a true ½ code rate sequence coding may be employed to pick up additional coding gain when compared to performing uncoded modulation as described with respect to the FIG. 18A.

In general, the various embodiments described with respect to the FIG. 17A, FIG. 17B, FIG. 18A, and FIG. 18B may be summarized as follows: unless a reduction of dimensions permits to evade stronger interference in some dimensions than in others, using all available signal dimensions will present an optimum implementation solution according to the invention.

Moreover, the invention relies on and extends the concept of reducing the number of dimensions that are transmitted in order to gain an advantage over various types of noise. This reduction in transmitted dimensions, coupled with intelligent processing at the receiver, provides an extremely large processing gain. The various embodiments described herein extend this concept to white noise, or equivalently, to increased plant attenuation. From certain perspectives, white noise can be thought of as a limiting case of colored noise, where the color is white. In the case of white noise, the processing gain may not be as great as for colored noise. However, the advantage (which may be realized as a 3 dB for a reduction in the number of used codes from 128 down to 64 codes, and which may be realized as up to an 18 dB gain for a reduction down to 2 codes, at the expense of throughput) is still worth obtaining in some communication system applications. This may be viewed as being particular useful when constraints exist on the modulation order; this may be viewed as arising in an application where there is a very limited number of burst profiles that are available for use. In addition, the idea of increasing the transmitted power on the active dimensions, to take advantage of the lack of power transmitted on the inactive dimensions may be viewed in this invention as being applied to combat the deleterious effects introduced by white noise within a communication system.

Various aspects of the invention can be found in a communication system that supports attenuated transmission adaptation. The communication system comprises a transmitting device communicatively coupled to a receiving device via a communication channel. The transmitting device is operable to transmit information to the receiving device using a plurality of active codes. Each active code is transmitted using a first power per code. The receiving device, communicatively coupled to the transmitting device via a communication channel, is operable to receive transmitted information from the transmitting device. The receiving device instructs the transmitting device to transmit information using a plurality of permitted codes, and the receiving device also instructs the transmitting device to transmit each permitted code using a second power per code. The communication channel comprises a spectrum portion that is partitioned into a plurality of logical channels.

In certain embodiments of the invention, the transmitting device is a cable modem (CM), and the receiving device is a Cable Modem Termination System (CMTS). However, it is understood that a variety of different devices may be employed in various types of communication systems without departing from the scope and spirit of the invention. For example, the transmitting device may be any one of a satellite transmitter, a High Definition Television (HDTV) transmitter, a mobile transmitter, a base station transmitter, a mobile transceiver, a microwave transmitter, or a microwave transceiver among other transmitting device types. Analogously, the receiving device may be any one of a satellite receiver, a High Definition Television (HDTV) set top box receiver, a mobile receiver, a base station receiver, a mobile transceiver, a microwave receiver, or a microwave transceiver, among other receiving device types. In addition, the type of communication system in which the invention may be employed is also varied; the communication system may be any one of a cable modem communication system, a satellite communication system, a High Definition Television (HDTV) communication system, a cellular communication system, a microwave communication system, a point-to-point radio communication system, a uni-directional communication system, a bi-directional communication system, or a one to many communication system.

The logical channels may be composed of a number of Synchronous Code Division Multiple Access (S-CDMA) channels in one embodiment. Moreover, the logical channels may be implemented using a plurality of multi-dimensional logical channels. For example, the plurality of multi-dimensional logical channels may be a 2 dimensional logical channel having a time dimension and a code dimension, or a 3 dimensional logical channel having a time dimension, a code dimension, and a frequency dimension. The transmitting device is able to simultaneously transmit the information to the receiving device using two or more of the multi-dimensional logical channels. The plurality of active codes includes unused codes and permitted codes. The receiving device is operable to perform interference cancellation using the unused codes. A ratio of the first power per code over the second power per code is substantially an inverse of a ratio of the number of active codes over a number of permitted codes.

The transmitting device performs ranging and registering of the communication channel that communicatively couples the transmitting device and the receiving device using a plurality of maximally robust burst parameters. The transmitting device sends a ranging burst to the receiving device via a robust logical channel; the robust logical channel is one of the logical channels. The maximally robust burst parameters include a highly robust and low order modulation. The maximally robust burst parameters may include either an extended preamble or a plurality of copies of a preamble. The receiving device is operable to perform parameter estimation of the communication channel using the plurality of copies of the preamble, and the receiving device generates an average parameter estimation by averaging over the plurality of copies of the preamble.

When the ranging and registering of the communication channel is completed, the receiving device instructs the transmitting device to move to a multi-dimensional logical channel, and the transmitting device subsequently operates using the multi-dimensional logical channel while employing a plurality of parameters having a higher order than the plurality of maximally robust burst parameters.

The ranging and registering of the communication channel may be performed when the receiving device instructs the transmitting device to do so, or transmitting device itself may initiate the ranging and registering of the communication channel. The transmitting device uses a modulation when transmitting information using the plurality of active codes. Even after the transmitting device reduces the number of codes employed to transmit information, to the plurality of permitted codes, the ranging and registering of the communication channel may employ that same modulation. In addition, the communication system may operate at the same throughput and efficiency after reducing the number of codes as it did beforehand, thereby maintaining the same throughput and efficiency of the communication system. In some instance, the Signal to Noise Ratio (SNR) that is achieved after reducing the number of codes employed to the plurality of permitted codes is even greater than the SNR that is achieved beforehand.

Other aspects of the invention can be found in an attenuated transmission adaptation method. The method involves instructing a Cable Modem (CM), using a Cable Modem Termination System (CMTS), to reduce a number of transmit codes from a plurality of active codes to a plurality of permitted codes, the reduction in the number of transmit codes being a reduction factor. The method also involves instructing the CM to increase a transmitted power per code for each permitted code of the plurality of permitted codes by approximately an inverse of the reduction factor. The CM and the CMTS are communicatively coupled via a communication channel, and the communication channel comprises a spectrum portion that is partitioned into a plurality of logical channels.

In certain embodiments, the logical channels are made up of a plurality of multi-dimensional logical channels. The multi-dimensional logical channels may be 2, 3, or n-dimensional logical channels. For example, one type of a 2 dimensional logical channel includes a time dimension and a code dimension, and one type of a 3 dimensional logical channel includes a time dimension, a code dimension, and a frequency dimension. The CM is able to simultaneously transmit the information to the CMTS using two or more multi-dimensional logical channels. The method may also involve performing ranging and registering of the communication channel that communicatively couples the CM and the CMTS using a plurality of maximally robust burst parameters and using a robust logical channel. The maximally robust burst parameters may include a highly robust and low order modulation. In addition, the maximally robust burst parameters may include one or more of an extended preamble and a number of copies of a preamble. The method may also involve performing parameter estimation of the communication channel, at the CMTS, by averaging over the copies of the preamble.

The method may also involve instructing the CM, using the CMTS, to move to a multi-dimensional logical channel when the ranging and registering of the communication channel is completed. The method may involve subsequently operating the CM using the multi-dimensional logical channel while employing parameters having a higher order than the maximally robust burst parameters. The CMTS may instruct the CM to perform the ranging and registering of the communication channel. Alternatively, the CM may itself initiate the ranging and registering of the communication channel.

The method also allows transmitting information across the communication channel, from the CM to the CMTS, at a modulation when using either the plurality of active codes or the plurality of permitted codes. In addition, the SNR that is provided after switching to the plurality or permitted codes from the plurality of active codes may even be improved. Moreover, the throughput and efficiency may be maintained after switching to the plurality of permitted codes from the plurality of active codes.

While the method has been described in the context of a cable modem communication system, it is noted that a variety of other communication systems, having a transmitting device and a receiving device, may also perform the method described herein. Some examples of such communication systems include any one of a satellite communication system, a High Definition Television (HDTV) communication system, a cellular communication system, a microwave communication system, a point-to-point radio communication system, a uni-directional communication system, a bi-directional communication system, and a one to many communication system.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
a receiver module that is operative to receive information transmitted from at least one additional apparatus using a plurality of orthogonal signaling dimensions via a communication channel; and
a transmission instruction module that is operative to generate a control signal, based upon the received information, that is effective to instruct the at least one additional apparatus to modify at least one of:
a number of orthogonal signaling dimensions within the plurality of orthogonal signaling dimensions employed for a subsequent transmission there from; and
a power per orthogonal signaling dimension for at least one of the plurality of orthogonal signaling dimensions for the subsequent transmission there from.

2. The apparatus of claim 1, wherein:
a modification of the number of orthogonal signaling dimensions within the plurality of orthogonal signaling dimensions is a reduction in the number of orthogonal signaling dimensions within the plurality of orthogonal signaling dimensions to a plurality of permitted orthogonal signaling dimensions.

3. The apparatus of claim 1, wherein:
a modification of the power per orthogonal signaling dimension for the at least one of the plurality of orthogonal signaling dimensions is an increase of the power per orthogonal signaling dimension.

4. The apparatus of claim 3, wherein:
a first power per orthogonal signaling dimension corresponding to a first of the plurality of orthogonal signaling dimensions is increased by a first amount; and
a second power per orthogonal signaling dimension corresponding to a second of the plurality of orthogonal signaling dimensions is increased by a second amount.

5. The apparatus of claim 1, wherein:
the plurality of orthogonal signaling dimensions is a plurality of code division multiple access (CDMA) signaling dimensions, a plurality of synchronous code division multiple access (S-CDMA) signaling dimensions, a plurality of time division multiple access (TDMA) signaling dimensions, a plurality of orthogonal frequency division multiplexing (OFDM) signaling dimensions, or a plurality of discrete multi-tone (DMT) signaling dimensions.

6. The apparatus of claim 1, wherein:
the plurality of orthogonal signaling dimensions includes a plurality of unused orthogonal signaling dimensions and plurality of permitted orthogonal signaling dimensions; and
the apparatus is operative to perform interference cancellation within the received information using the plurality of unused orthogonal signaling dimensions.

7. The apparatus of claim 1, wherein:
the plurality of orthogonal signaling dimensions includes a plurality of unused orthogonal signaling dimensions and plurality of permitted orthogonal signaling dimensions;
a modification of the power per orthogonal signaling dimension for the at least one of the plurality of orthogonal signaling dimensions is a modification from a first power per orthogonal signaling dimension to a second power per orthogonal signaling dimension;
a ratio of the first power per orthogonal signaling dimension over the second power per orthogonal signaling dimension is at least one of:
  an inverse of a ratio of a number of orthogonal signaling dimensions within the plurality of orthogonal signaling dimensions over a number of permitted orthogonal signaling dimensions within the plurality of permitted orthogonal signaling dimensions; and
  a ratio of the number of permitted orthogonal signaling dimensions within the plurality of permitted orthogonal signaling dimensions over the number of orthogonal signaling dimension within the plurality of orthogonal signaling dimensions.

8. The apparatus of claim 1, wherein:
the communication channel includes a spectrum portion that is partitioned into a plurality of logical channels; and
the apparatus simultaneously receives the information transmitted from the transmitting apparatus via at least two of the plurality of logical channels.

9. The apparatus of claim 1, wherein:
the apparatus is a cellular communication device that is operative within a cellular communication system.

10. The apparatus of claim 9, wherein:
the cellular communication system is a bi-directional cellular communication system.

11. A cellular communication device, comprising:
a receiver module that is operative to receive information transmitted from at least one additional cellular communication device using a plurality of orthogonal signaling dimensions via a communication channel; and
a transmission instruction module that is operative to generate a control signal, based upon the received information, that is effective to instruct the at least one additional cellular communication to modify at least one of:
  a number of orthogonal signaling dimensions within the plurality of orthogonal signaling dimensions employed for a subsequent transmission there from; and
  a power per orthogonal signaling dimension for at least one of the plurality of orthogonal signaling dimensions for the subsequent transmission there from; and wherein:
the cellular communication system is a bi-directional cellular communication system.

12. The cellular communication device of claim 11, wherein:
a modification of the number of orthogonal signaling dimensions within the plurality of orthogonal signaling dimensions is a reduction in the number of orthogonal signaling dimensions within the plurality of orthogonal signaling dimensions to a plurality of permitted orthogonal signaling dimensions.

13. The cellular communication device of claim 11, wherein:
a modification of the power per orthogonal signaling dimension for the at least one of the plurality of orthogonal signaling dimensions is an increase of the power per orthogonal signaling dimension.

14. The cellular communication device of claim 13, wherein:
a first power per orthogonal signaling dimension corresponding to a first of the plurality of orthogonal signaling dimensions is increased by a first amount; and
a second power per orthogonal signaling dimension corresponding to a second of the plurality of orthogonal signaling dimensions is increased by a second amount.

15. The cellular communication device of claim 11, wherein:
the plurality of orthogonal signaling dimensions is a plurality of code division multiple access (CDMA) signaling dimensions, a plurality of synchronous code division multiple access (S-CDMA) signaling dimensions, a plurality of time division multiple access (TDMA) signaling dimensions, a plurality of orthogonal frequency division multiplexing (OFDM) signaling dimensions, or a plurality of discrete multi-tone (DMT) signaling dimensions.

16. The cellular communication device of claim 11, wherein:
the plurality of orthogonal signaling dimensions includes a plurality of unused orthogonal signaling dimensions and plurality of permitted orthogonal signaling dimensions; and
the apparatus is operative to perform interference cancellation within the received information using the plurality of unused orthogonal signaling dimensions.

17. The cellular communication device of claim 11, wherein:
- the plurality of orthogonal signaling dimensions includes a plurality of unused orthogonal signaling dimensions and plurality of permitted orthogonal signaling dimensions;
- a modification of the power per orthogonal signaling dimension for the at least one of the plurality of orthogonal signaling dimensions is a modification from a first power per orthogonal signaling dimension to a second power per orthogonal signaling dimension;
- a ratio of the first power per orthogonal signaling dimension over the second power per orthogonal signaling dimension is at least one of:
  - an inverse of a ratio of a number of orthogonal signaling dimensions within the plurality of orthogonal signaling dimensions over a number of permitted orthogonal signaling dimensions within the plurality of permitted orthogonal signaling dimensions; and
  - a ratio of the number of permitted orthogonal signaling dimensions within the plurality of permitted orthogonal signaling dimensions over the number of orthogonal signaling dimension within the plurality of orthogonal signaling dimensions.

18. A method, comprising:
- employing a communication device to receive information transmitted from at least one additional communication device using a plurality of orthogonal signaling dimensions via a communication channel; and
- based upon the received information, generating a control signal effective to instruct the at least one additional communication device to perform at least one of:
  - modifying a number of orthogonal signaling dimensions within the plurality of orthogonal signaling dimensions employed for a subsequent transmission there from; and
  - modifying a power per orthogonal signaling dimension for at least one of the plurality of orthogonal signaling dimensions for the subsequent transmission there from.

19. The method of claim 18, wherein:
- a modification of the number of orthogonal signaling dimensions within the plurality of orthogonal signaling dimensions is a reduction in the number of orthogonal signaling dimensions within the plurality of orthogonal signaling dimensions to a plurality of permitted orthogonal signaling dimensions; and
- a modification of the power per orthogonal signaling dimension for the at least one of the plurality of orthogonal signaling dimensions is an increase of the power per orthogonal signaling dimension.

20. The method of claim 18, wherein:
the plurality of orthogonal signaling dimensions is a plurality of code division multiple access (CDMA) signaling dimensions, a plurality of synchronous code division multiple access (S-CDMA) signaling dimensions, a plurality of time division multiple access (TDMA) signaling dimensions, a plurality of orthogonal frequency division multiplexing (OFDM) signaling dimensions, or a plurality of discrete multi-tone (DMT) signaling dimensions.

* * * * *